(12) United States Patent
Weingarten

(10) Patent No.: US 8,566,510 B2
(45) Date of Patent: *Oct. 22, 2013

(54) SYSTEMS AND METHOD FOR FLASH MEMORY MANAGEMENT

(75) Inventor: Hanan Weingarten, Herzelia (IL)

(73) Assignee: Densbits Technologies Ltd., Haifa (IL)

( * ) Notice: Subject to any disclaimer, the term of this patent is extended or adjusted under 35 U.S.C. 154(b) by 735 days.

This patent is subject to a terminal disclaimer.

(21) Appl. No.: 12/776,804

(22) Filed: May 10, 2010

(65) Prior Publication Data

US 2010/0293321 A1    Nov. 18, 2010

Related U.S. Application Data

(60) Provisional application No. 61/177,301, filed on May 12, 2009.

(51) Int. Cl.
*G06F 12/00* (2006.01)

(52) U.S. Cl.
USPC ........... 711/103; 711/206; 711/154; 711/100; 711/1

(58) Field of Classification Search
None
See application file for complete search history.

(56) References Cited

U.S. PATENT DOCUMENTS

| | | | |
|---|---|---|---|
| 4,463,375 A | 7/1984 | Macovski | |
| 4,584,686 A | 4/1986 | Fritze | |
| 4,589,084 A | 5/1986 | Fling et al. | |
| 4,866,716 A | 9/1989 | Weng | |
| 5,077,737 A | 12/1991 | Leger et al. | |
| 5,297,153 A | 3/1994 | Baggen et al. | |
| 5,592,641 A * | 1/1997 | Fandrich et al. | 711/103 |
| 5,623,620 A * | 4/1997 | Fandrich et al. | 711/202 |
| 5,640,529 A * | 6/1997 | Hasbun | 711/103 |
| 5,657,332 A | 8/1997 | Auclair et al. | |
| 5,729,490 A | 3/1998 | Calligaro et al. | |
| 5,740,395 A * | 4/1998 | Wells et al. | 711/103 |
| 5,745,418 A * | 4/1998 | Ma et al. | 365/185.33 |
| 5,793,774 A | 8/1998 | Usui et al. | |
| 5,926,409 A | 7/1999 | Engh et al. | |
| 5,933,368 A * | 8/1999 | Ma et al. | 365/185.33 |
| 5,956,268 A | 9/1999 | Lee | |
| 5,956,473 A * | 9/1999 | Ma et al. | 714/5.1 |
| 5,982,659 A | 11/1999 | Irrinki et al. | |
| 6,038,634 A | 3/2000 | Ji et al. | |
| 6,081,878 A * | 6/2000 | Estakhri et al. | 711/168 |

(Continued)

OTHER PUBLICATIONS

Search Report of PCT Patent Application WO 2009/118720 A3.

(Continued)

*Primary Examiner* — Sheng-Jen Tsai
*Assistant Examiner* — Ramon A Mercado
(74) *Attorney, Agent, or Firm* — Dentons US LLP

(57) ABSTRACT

A system and method for merging sectors of a flash memory module, the method includes: receiving multiple sectors, each received sector is associated with a current erase block out of multiple (L) erase blocks; accumulating the received sectors in a sector buffer, the sector buffer is stored in a non-volatile memory module; maintaining a merged sector map indicative of a sectors of the sector buffer that have been merged and sectors of the sector buffer waiting to be merged; finding a first sector waiting to be merged according to the merged sector map; merging the first sector and other sectors that belong to a same erase block as the first sector; and updating the merged sector map to indicate that that the first second and the other sectors that belonged to the same erase block were merged.

26 Claims, 13 Drawing Sheets

(56) References Cited

U.S. PATENT DOCUMENTS

| | | | |
|---|---|---|---|
| 6,094,465 A | 7/2000 | Stein et al. | |
| 6,119,245 A | 9/2000 | Hiratsuka | |
| 6,182,261 B1 | 1/2001 | Haller et al. | |
| 6,192,497 B1 | 2/2001 | Yang et al. | |
| 6,195,287 B1 | 2/2001 | Hirano | |
| 6,199,188 B1 | 3/2001 | Shen et al. | |
| 6,209,114 B1 | 3/2001 | Wolf et al. | |
| 6,259,627 B1 | 7/2001 | Wong | |
| 6,272,052 B1* | 8/2001 | Miyauchi | 365/185.33 |
| 6,278,633 B1 | 8/2001 | Wong et al. | |
| 6,279,133 B1 | 8/2001 | Vafai et al. | |
| 6,301,151 B1 | 10/2001 | Engh et al. | |
| 6,370,061 B1 | 4/2002 | Yachareni et al. | |
| 6,374,383 B1 | 4/2002 | Weng | |
| 6,504,891 B1 | 1/2003 | Chevallier | |
| 6,532,169 B1 | 3/2003 | Mann et al. | |
| 6,532,556 B1 | 3/2003 | Wong et al. | |
| 6,553,533 B2 | 4/2003 | Demura et al. | |
| 6,560,747 B1 | 5/2003 | Weng | |
| 6,637,002 B1 | 10/2003 | Weng et al. | |
| 6,639,865 B2 | 10/2003 | Kwon | |
| 6,674,665 B1 | 1/2004 | Mann et al. | |
| 6,675,281 B1* | 1/2004 | Oh et al. | 711/207 |
| 6,704,902 B1 | 3/2004 | Shinbashi et al. | |
| 6,751,766 B2 | 6/2004 | Guterman et al. | |
| 6,772,274 B1 | 8/2004 | Estakhri | |
| 6,781,910 B2 | 8/2004 | Smith | |
| 6,792,569 B2 | 9/2004 | Cox et al. | |
| 6,873,543 B2 | 3/2005 | Smith et al. | |
| 6,891,768 B2 | 5/2005 | Smith et al. | |
| 6,914,809 B2 | 7/2005 | Hilton et al. | |
| 6,915,477 B2 | 7/2005 | Gollamudi et al. | |
| 6,952,365 B2 | 10/2005 | Gonzalez et al. | |
| 6,961,890 B2 | 11/2005 | Smith | |
| 6,990,012 B2 | 1/2006 | Smith et al. | |
| 6,996,004 B1 | 2/2006 | Fastow et al. | |
| 6,999,854 B2 | 2/2006 | Roth | |
| 7,010,739 B1 | 3/2006 | Feng et al. | |
| 7,012,835 B2 | 3/2006 | Gonzalez et al. | |
| 7,038,950 B1 | 5/2006 | Hamilton et al. | |
| 7,068,539 B2 | 6/2006 | Guterman et al. | |
| 7,079,436 B2 | 7/2006 | Perner et al. | |
| 7,149,950 B2 | 12/2006 | Spencer et al. | |
| 7,177,977 B2 | 2/2007 | Chen et al. | |
| 7,191,379 B2 | 3/2007 | Adelmann et al. | |
| 7,196,946 B2 | 3/2007 | Chen et al. | |
| 7,203,874 B2 | 4/2007 | Roohparvar | |
| 7,212,426 B2* | 5/2007 | Park et al | 365/120 |
| 7,290,203 B2 | 10/2007 | Emma et al. | |
| 7,292,365 B2 | 11/2007 | Knox | |
| 7,301,928 B2 | 11/2007 | Nakabayashi et al. | |
| 7,315,916 B2* | 1/2008 | Bennett et al. | 711/103 |
| 7,441,067 B2 | 10/2008 | Gorobets et al. | |
| 7,466,575 B2 | 12/2008 | Shalvi et al. | |
| 7,533,328 B2 | 5/2009 | Alrod et al. | |
| 7,558,109 B2 | 7/2009 | Brandman et al. | |
| 7,593,263 B2 | 9/2009 | Sokolov et al. | |
| 7,610,433 B2* | 10/2009 | Randell et al. | 711/101 |
| 7,697,326 B2 | 4/2010 | Sommer et al. | |
| 7,706,182 B2 | 4/2010 | Shalvi et al. | |
| 7,804,718 B2 | 9/2010 | Kim | |
| 7,805,663 B2 | 9/2010 | Brandman et al. | |
| 7,805,664 B1 | 9/2010 | Yang et al. | |
| 7,844,877 B2 | 11/2010 | Litsyn et al. | |
| 7,961,797 B1 | 6/2011 | Yang et al. | |
| 8,020,073 B2 | 9/2011 | Emma et al. | |
| 8,108,590 B2* | 1/2012 | Chow et al. | 711/103 |
| 8,122,328 B2 | 2/2012 | Liu et al. | |
| 2002/0063774 A1 | 5/2002 | Hillis et al. | |
| 2002/0085419 A1 | 7/2002 | Kwon et al. | |
| 2002/0154769 A1 | 10/2002 | Petersen et al. | |
| 2002/0156988 A1* | 10/2002 | Toyama et al. | 711/203 |
| 2003/0014582 A1* | 1/2003 | Nakanishi | 711/103 |
| 2003/0065876 A1 | 4/2003 | Lasser | |
| 2003/0101404 A1 | 5/2003 | Zhao et al. | |
| 2003/0105620 A1 | 6/2003 | Bowen | |
| 2003/0192007 A1 | 10/2003 | Miller et al. | |
| 2004/0015771 A1 | 1/2004 | Lasser et al. | |
| 2004/0030971 A1 | 2/2004 | Tanaka et al. | |
| 2004/0153722 A1 | 8/2004 | Lee | |
| 2004/0153817 A1 | 8/2004 | Norman et al. | |
| 2004/0181735 A1 | 9/2004 | Xin | |
| 2005/0013165 A1 | 1/2005 | Ban | |
| 2005/0018482 A1 | 1/2005 | Cemea et al. | |
| 2005/0083735 A1 | 4/2005 | Chen et al. | |
| 2005/0117401 A1 | 6/2005 | Chen et al. | |
| 2005/0120265 A1 | 6/2005 | Pline et al. | |
| 2005/0128811 A1 | 6/2005 | Kato et al. | |
| 2005/0138533 A1 | 6/2005 | Le-Bars et al. | |
| 2005/0144213 A1 | 6/2005 | Simkins et al. | |
| 2005/0144368 A1 | 6/2005 | Chung et al. | |
| 2005/0169057 A1 | 8/2005 | Shibata et al. | |
| 2005/0172179 A1 | 8/2005 | Brandenberger et al. | |
| 2005/0213393 A1 | 9/2005 | Lasser | |
| 2006/0059406 A1 | 3/2006 | Micheloni et al. | |
| 2006/0059409 A1 | 3/2006 | Lee | |
| 2006/0064537 A1 | 3/2006 | Oshima et al. | |
| 2006/0101193 A1 | 5/2006 | Murin | |
| 2006/0203587 A1 | 9/2006 | Li et al. | |
| 2006/0221692 A1 | 10/2006 | Chen | |
| 2006/0248434 A1 | 11/2006 | Radke et al. | |
| 2006/0268608 A1 | 11/2006 | Noguchi et al. | |
| 2006/0294312 A1 | 12/2006 | Walmsley | |
| 2007/0025157 A1 | 2/2007 | Wan et al. | |
| 2007/0063180 A1 | 3/2007 | Asano et al. | |
| 2007/0103992 A1 | 5/2007 | Sakui et al. | |
| 2007/0104004 A1 | 5/2007 | So et al. | |
| 2007/0109858 A1 | 5/2007 | Conley et al. | |
| 2007/0124652 A1 | 5/2007 | Litsyn et al. | |
| 2007/0143561 A1 | 6/2007 | Gorobets | |
| 2007/0150694 A1 | 6/2007 | Chang et al. | |
| 2007/0168625 A1 | 7/2007 | Cornwell et al. | |
| 2007/0171714 A1 | 7/2007 | Wu et al. | |
| 2007/0171730 A1 | 7/2007 | Ramamoorthy et al. | |
| 2007/0180346 A1 | 8/2007 | Murin | |
| 2007/0223277 A1 | 9/2007 | Tanaka et al. | |
| 2007/0226582 A1 | 9/2007 | Tang et al. | |
| 2007/0226592 A1 | 9/2007 | Radke | |
| 2007/0228449 A1 | 10/2007 | Takano et al. | |
| 2007/0253249 A1 | 11/2007 | Kang et al. | |
| 2007/0253250 A1 | 11/2007 | Shibata et al. | |
| 2007/0263439 A1 | 11/2007 | Cornwell et al. | |
| 2007/0266291 A1 | 11/2007 | Toda et al. | |
| 2007/0271494 A1 | 11/2007 | Gorobets | |
| 2008/0010581 A1 | 1/2008 | Alrod et al. | |
| 2008/0028014 A1 | 1/2008 | Hilt et al. | |
| 2008/0055989 A1 | 3/2008 | Lee et al. | |
| 2008/0082897 A1 | 4/2008 | Brandman et al. | |
| 2008/0092026 A1 | 4/2008 | Brandman et al. | |
| 2008/0104309 A1 | 5/2008 | Cheon et al. | |
| 2008/0116509 A1 | 5/2008 | Harari et al. | |
| 2008/0126686 A1 | 5/2008 | Sokolov et al. | |
| 2008/0127104 A1 | 5/2008 | Li et al. | |
| 2008/0128790 A1 | 6/2008 | Jung | |
| 2008/0130341 A1 | 6/2008 | Shalvi et al. | |
| 2008/0137413 A1 | 6/2008 | Kong et al. | |
| 2008/0148115 A1 | 6/2008 | Sokolov et al. | |
| 2008/0158958 A1 | 7/2008 | Sokolov et al. | |
| 2008/0159059 A1 | 7/2008 | Moyer | |
| 2008/0162079 A1 | 7/2008 | Astigarraga et al. | |
| 2008/0168216 A1 | 7/2008 | Lee | |
| 2008/0168320 A1 | 7/2008 | Cassuto et al. | |
| 2008/0181001 A1 | 7/2008 | Shalvi | |
| 2008/0198650 A1 | 8/2008 | Shalvi et al. | |
| 2008/0198652 A1 | 8/2008 | Shalvi et al. | |
| 2008/0219050 A1 | 9/2008 | Shalvi et al. | |
| 2008/0225599 A1 | 9/2008 | Chae | |
| 2008/0250195 A1* | 10/2008 | Chow et al. | 711/103 |
| 2008/0263262 A1 | 10/2008 | Sokolov et al. | |
| 2008/0282106 A1 | 11/2008 | Shalvi et al. | |
| 2008/0285351 A1 | 11/2008 | Shlick et al. | |
| 2008/0301532 A1 | 12/2008 | Uchikawa et al. | |
| 2009/0024905 A1 | 1/2009 | Shalvi et al. | |
| 2009/0043951 A1 | 2/2009 | Shalvi et al. | |

(56) References Cited

U.S. PATENT DOCUMENTS

| | | |
|---|---|---|
| 2009/0072303 A9 | 3/2009 | Prall et al. |
| 2009/0091979 A1 | 4/2009 | Shalvi |
| 2009/0103358 A1 | 4/2009 | Sommer et al. |
| 2009/0106485 A1 | 4/2009 | Anholt |
| 2009/0113275 A1 | 4/2009 | Chen et al. |
| 2009/0125671 A1 | 5/2009 | Flynn et al. |
| 2009/0144600 A1 | 6/2009 | Perlmutter et al. |
| 2009/0150748 A1 | 6/2009 | Egner et al. |
| 2009/0157964 A1 | 6/2009 | Kasorla et al. |
| 2009/0158126 A1 | 6/2009 | Perlmutter et al. |
| 2009/0168524 A1 | 7/2009 | Golov et al. |
| 2009/0187803 A1 | 7/2009 | Anholt et al. |
| 2009/0199074 A1 | 8/2009 | Sommer |
| 2009/0213653 A1 | 8/2009 | Perlmutter et al. |
| 2009/0213654 A1 | 8/2009 | Perlmutter et al. |
| 2009/0228761 A1 | 9/2009 | Perlmutter et al. |
| 2009/0240872 A1 | 9/2009 | Perlmutter et al. |
| 2010/0005270 A1 | 1/2010 | Jiang |
| 2010/0030944 A1* | 2/2010 | Hinz ........................ 711/103 |
| 2010/0058146 A1 | 3/2010 | Weingarten et al. |
| 2010/0064096 A1 | 3/2010 | Weingarten et al. |
| 2010/0088557 A1 | 4/2010 | Weingarten et al. |
| 2010/0091535 A1 | 4/2010 | Sommer et al. |
| 2010/0095186 A1 | 4/2010 | Weingarten |
| 2010/0110787 A1 | 5/2010 | Shalvi et al. |
| 2010/0115376 A1 | 5/2010 | Shalvi et al. |
| 2010/0122113 A1 | 5/2010 | Weingarten et al. |
| 2010/0124088 A1 | 5/2010 | Shalvi et al. |
| 2010/0131580 A1 | 5/2010 | Kanter et al. |
| 2010/0131806 A1 | 5/2010 | Weingarten et al. |
| 2010/0131809 A1 | 5/2010 | Katz |
| 2010/0131826 A1 | 5/2010 | Shalvi et al. |
| 2010/0131827 A1 | 5/2010 | Sokolov et al. |
| 2010/0131831 A1 | 5/2010 | Weingarten et al. |
| 2010/0146191 A1 | 6/2010 | Katz |
| 2010/0146192 A1 | 6/2010 | Weingarten et al. |
| 2010/0149881 A1 | 6/2010 | Lee et al. |
| 2010/0180073 A1 | 7/2010 | Weingarten et al. |
| 2010/0199149 A1 | 8/2010 | Weingarten et al. |
| 2010/0211724 A1 | 8/2010 | Weingarten |
| 2010/0211833 A1 | 8/2010 | Weingarten |
| 2010/0211856 A1 | 8/2010 | Weingarten |
| 2010/0251066 A1 | 9/2010 | Radke |
| 2010/0253555 A1 | 10/2010 | Weingarten et al. |
| 2010/0257309 A1 | 10/2010 | Barsky et al. |
| 2010/0293321 A1 | 11/2010 | Weingarten |
| 2011/0051521 A1 | 3/2011 | Levy et al. |
| 2011/0055461 A1 | 3/2011 | Steiner et al. |
| 2011/0096612 A1 | 4/2011 | Steiner et al. |
| 2011/0119562 A1 | 5/2011 | Steiner et al. |
| 2011/0153919 A1 | 6/2011 | Sabbag |
| 2011/0161775 A1 | 6/2011 | Weingarten |
| 2011/0214029 A1 | 9/2011 | Steiner et al. |
| 2011/0214039 A1 | 9/2011 | Steiner et al. |
| 2011/0246792 A1 | 10/2011 | Weingarten |
| 2011/0246852 A1 | 10/2011 | Sabbag |
| 2011/0252187 A1 | 10/2011 | Segal et al. |
| 2011/0252188 A1 | 10/2011 | Weingarten |
| 2011/0271043 A1 | 11/2011 | Segal et al. |
| 2011/0302428 A1 | 12/2011 | Weingarten |
| 2012/0001778 A1 | 1/2012 | Steiner et al. |
| 2012/0005554 A1 | 1/2012 | Steiner et al. |
| 2012/0005558 A1 | 1/2012 | Steiner et al. |
| 2012/0005560 A1 | 1/2012 | Steiner et al. |
| 2012/0008401 A1 | 1/2012 | Katz et al. |
| 2012/0008414 A1 | 1/2012 | Katz et al. |
| 2012/0051144 A1 | 3/2012 | Weingarten et al. |
| 2012/0063227 A1 | 3/2012 | Weingarten et al. |
| 2012/0066441 A1 | 3/2012 | Weingarten |
| 2012/0110250 A1 | 5/2012 | Sabbag et al. |

OTHER PUBLICATIONS

Search Report of PCT Patent Application WO 2009/095902 A3.
Search Report of PCT Patent Application WO 2009/078006 A3.
Search Report of PCT Patent Application WO 2009/074979 A3.
Search Report of PCT Patent Application WO 2009/074978 A3.
Search Report of PCT Patent Application WO 2009/072105 A3.
Search Report of PCT Patent Application WO 2009/072104 A3.
Search Report of PCT Patent Application WO 2009/072103 A3.
Search Report of PCT Patent Application WO 2009/072102 A3.
Search Report of PCT Patent Application WO 2009/072101 A3.
Search Report of PCT Patent Application WO 2009/072100 A3.
Search Report of PCT Patent Application WO 2009/053963 A3.
Search Report of PCT Patent Application WO 2009/053962 A3.
Search Report of PCT Patent Application WO 2009/053961 A3.
Search Report of PCT Patent Application WO 2009/037697 A3.
Yani Chen, Keshab K. Parhi, "Small Area Parallel Chien Search Architectures for Long BCH Codes", Ieee Transactions on Very Large Scale Integration(VLSI) Systems, vol. 12, No. 5, May 2004.
Yuejian Wu, "Low Power Decoding of BCH Codes", Nortel Networks, Ottawa, Ont., Canada, in Circuits and systems, 2004. ISCAS '04. Proceeding of the 2004 International Symposium on Circuits and Systems, published May 23-26, 2004, vol. 2, pp. II-369-II-372 vol. 2.
Michael Purser, "Introduction to Error Correcting Codes", Artech House Inc., 1995.
Ron M. Roth, "Introduction to Coding Theory", Cambridge University Press, 2006.
Akash Kumar, Sergei Sawitzki, "High-Throughput and Low Power Architectures for Reed Solomon Decoder", (a.kumar at tue.nl, Eindhoven University of Technology and sergei.sawitzki at philips.com).
Todd K.Moon, "Error Correction Coding Mathematical Methods and Algorithms", A John Wiley & Sons, Inc., 2005.
Richard E. Blahut, "Algebraic Codes for Data Transmission", Cambridge University Press, 2003.
David Esseni, Bruno Ricco, "Trading-Off Programming Speed and Current Absorption in Flash Memories with the Ramped-Gate Programming Technique", Ieee Transactions on Electron Devices, vol. 47, No. 4, Apr. 2000.
Giovanni Campardo, Rino Micheloni, David Novosel, "VLSI—Design of Non-Volatile Memories", Springer Berlin Heidelberg New York, 2005.
John G. Proakis, "Digital Communications", 3rd ed., New York: McGraw-Hill, 1995.
J.M. Portal, H. Aziza, D. Nee, "EEPROM Memory: Threshold Voltage Built in Self Diagnosis", ITC International Test Conference, Paper 2.1.
J.M. Portal, H. Aziza, D. Nee, "EEPROM Diagnosis Based on Threshold Voltage Embedded Measurement", Journal of Electronic Testing: Theory and Applications 21, 33-42, 2005.
G. Tao, A. Scarpa, J. Dijkstra, W. Stidl, F. Kuper, "Data retention prediction for modern floating gate non-volatile memories", Microelectronics Reliability 40 (2000), 1561-1566.
T. Hirncno, N. Matsukawa, H. Hazama, K. Sakui, M. Oshikiri, K. Masuda, K. Kanda, Y. Itoh, J. Miyamoto, "A New Technique for Measuring Threshold Voltage Distribution in Flash EEPROM Devices", Proc. IEEE 1995 Int. Conference on Microelectronics Test Structures, vol. 8, Mar. 1995.
Boaz Eitan, Guy Cohen, Assaf Shappir, Eli Lusky, Amichai Givant, Meir Janai, Ilan Bloom, Yan Polansky, Oleg Dadashev, Avi Lavan, Ran Sahar, Eduardo Maayan, "4-bit per Cell NROM Reliability", Appears on the website of Saifun.com.
Paulo Cappelletti, Clara Golla, Piero Olivo, Enrico Zanoni, "Flash Memories", Kluwer Academic Publishers, 1999.
JEDEC Standard, "Stress-Test-Driven Qualification of Integrated Circuits", JEDEC Solid State Technology Association. JEDEC Standard No. 47F pp. 1-26.
Dempster, et al., "Maximum Likelihood from Incomplete Data via the EM Algorithm", Journal of the Royal Statistical Society. Series B (Methodological), vol. 39, No. 1 (1997), pp. 1-38.
Mielke, et al., "Flash EEPROM Threshold Instabilities due to Charge Trapping During Program/Erase Cycling", IEEE Transactions on Device and Materials Reliability, vol. 4, No. 3, Sep. 2004, pp. 335-344.

(56) References Cited

OTHER PUBLICATIONS

Daneshbeh, "Bit Serial Systolic Architectures for Multiplicative Inversion and Division over GF (2)", A thesis presented to the University of Waterloo, Ontario, Canada, 2005, pp. 1-118.

Chen, Formulas for the solutions of Quadratic Equations over GF (2), IEEE Trans. Inform. Theory, vol. IT-28, No. 5, Sep. 1982, pp. 792-794.

Berlekamp et al., "On the Solution of Algebraic Equations over Finite Fields", Inform. Cont. 10, Oct. 1967, pp. 553-564.

* cited by examiner

SYSTEMS AND METHOD FOR FLASH MEMORY MANAGEMENT

CROSS REFERENCE TO RELATED APPLICATIONS

This application claims the benefit of U.S. provisional Ser. No. 61/177,301, filed on May 12, 2009 (and entitled "Systems, methods, and data structures for flash memory management"), which is incorporated in its entirety herein by reference.

BACKGROUND OF THE INVENTION

Today's Flash memory devices store information with high density on Flash cells with ever smaller dimensions. In addition, Multi-Level Cells (MLC) store several bits per cell by setting the amount of charge in the cell. Flash devices are organized into (physical) pages. Each page contains a section allocated for data (512 bytes-8 Kbytes) and a small amount of spare bytes (16-32 or more bytes for every 512 data bytes) containing redundancy and back pointers. The redundancy bytes are used to store error correcting information, for correcting errors which may have occurred during the page Read. Each Program operation is performed on an entire page. A number of pages are grouped together to form an Erase Block (erase block). A page cannot be erased unless the entire erase block which contains it is erased.

One common application of Flash devices is SD cards. An SD card will typically contain Flash devices and a controller. The controller translates commands coming in through the SD interface into actions (Read/Write/Erase) on the Flash devices. The most common SD commands will be Read and Write sector commands where a sector is a sequence of 512 bytes. The read or write commands may be of a single sector or multiple sectors. These commands refer to logical addresses. These addresses can then be redirected to new addresses on the FLASH memory which need not directly correspond to the logical addresses. This is due to memory management carried out by the controller in order to support several features such as wear-leveling, bad block management, firmware code and data, error-correction, and more.

Due to the small dimensions and the price limitations on the card, the controller will typically have only a small RAM. This limits the type of memory management which will be carried out by the controller. The controller will typically manage the memory at the erase block level. That is, the logical memory space will be divided into units of memory contained within a single erase block (or some constant multiple of erase blocks) such that all logical sector addresses will be mapped to the same erase block. This requires that the controller will only hold an erase block allocation map rather than a sector allocation map (or some unit smaller than an erase block). This allows the controller to use only a small amount of memory for the purpose of management.

However, this type of management has the drawback that for random sector writes (or memory units smaller than an erase block), erase blocks must be frequently rewritten. To understand why consider that each new piece of information must be written into an empty page (in Flash memories a page may not be rewritten before the entire block is erased first).

If only a portion of the memory unit contained within an erase block is rewritten, it is written into a freshly allocated, erased erase block. The remaining, unmodified, content of the erase block must then be copied into the new erase block and the former erase-block is declared as free and erased. This operation is referred to as "sealing" or "merging". This includes collecting the most recent data of a logical block and merging it with the rest of the block data in a single erase block. Thus, even if only a single sector from an erase block is rewritten, a complete erase block must be rewritten. Apart from causing a significant degradation in the average write speed, it also imposes a significant delay in the response time between random write sector operations.

The SD 2.0 specification does not help as it also puts a limit on the write-time of a single sector (smaller than 250 mS). This may not be a problem if the page write time is short or the number of pages per block is small. For example, in a 2 bits per cell MLC Flash device there will typically be 128 pages per block and the page program will typically be around 1 ms. Therefore, the delay induced by a single random write operation will take around 130-150 mS.

However, in a 3 bit per cell device which has 192 pages per block and each page takes longer to program, a block merging operation is likely to require more than 250 mS.

There is therefore a need for a system and device that allows keeping pace with the incoming random sector write requests, regardless of the number of requests, without violating timing constraints such as the 250 mS time limit on each write sector operation.

SUMMARY OF THE INVENTION

According to an embodiment of the invention a system is provided. The system may include: an interface to receive multiple sectors, each received sector associated with a current erase block out of multiple erase blocks; a non-volatile memory module to store a sector buffer; and a memory controller configured to: control an accumulation of the received sectors in a sector buffer, the sector buffer being stored in a non-volatile memory module; maintain a merged sector map indicative of a sectors of the sector buffer that have been merged and non-merged sectors; find a first non-merged sector according to the merged sector map; merge the first sector and at least one additional sector that belong to a same erase block as the first non-merged sector; and update the merged sector map to indicate that that the first non-merged sector and the at least one additional sector that belonged to the same erase block were merged.

According to an embodiment of the invention a system is provided. The system may include: an interface, for receiving multiple sectors, each received sector is associated with a current erase block out of multiple (L) erase blocks; a non-volatile memory module, for storing a sector buffer; and a memory controller, for controlling an accumulation of the multiple sectors in the sector buffer, and for controlling a merging, upon a completion of at least one merge criterion, of received sectors that belong to a same current erase block and of at least one additional sector of the current erase block to provide a new erase According to an embodiment of the invention a method is provided. The method may include: receiving multiple sectors, each received sector is associated with a current erase block out of multiple (L) erase blocks; accumulating the multiple sectors in a sector buffer, the sector buffer is stored in a non-volatile memory module; maintaining a merged sector map indicative of a sectors of the sector buffer that have been merged and non-merged sectors of the sector buffer; finding a first non-merged sector according to the merged sector map; merging the first non-merged sector and an additional sector that belong to a same erase block as the first non-merged sector; and updating the merged sector map to indicate that that the first non-merged sector and the additional sectors that belonged to the same erase block were merged.

According to an embodiment of the invention a method is provided. The method may include: receiving multiple sectors, each received sector associated with a current erase block out of multiple (B) erase blocks; accumulating the multiple sectors in a sector buffer, the sector buffer stored in a non-volatile memory module; and merging, upon a completion of at least one merge criterion, received sectors belonging to a same current erase block and at least one additional sector of the current erase block to provide a new erase block.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
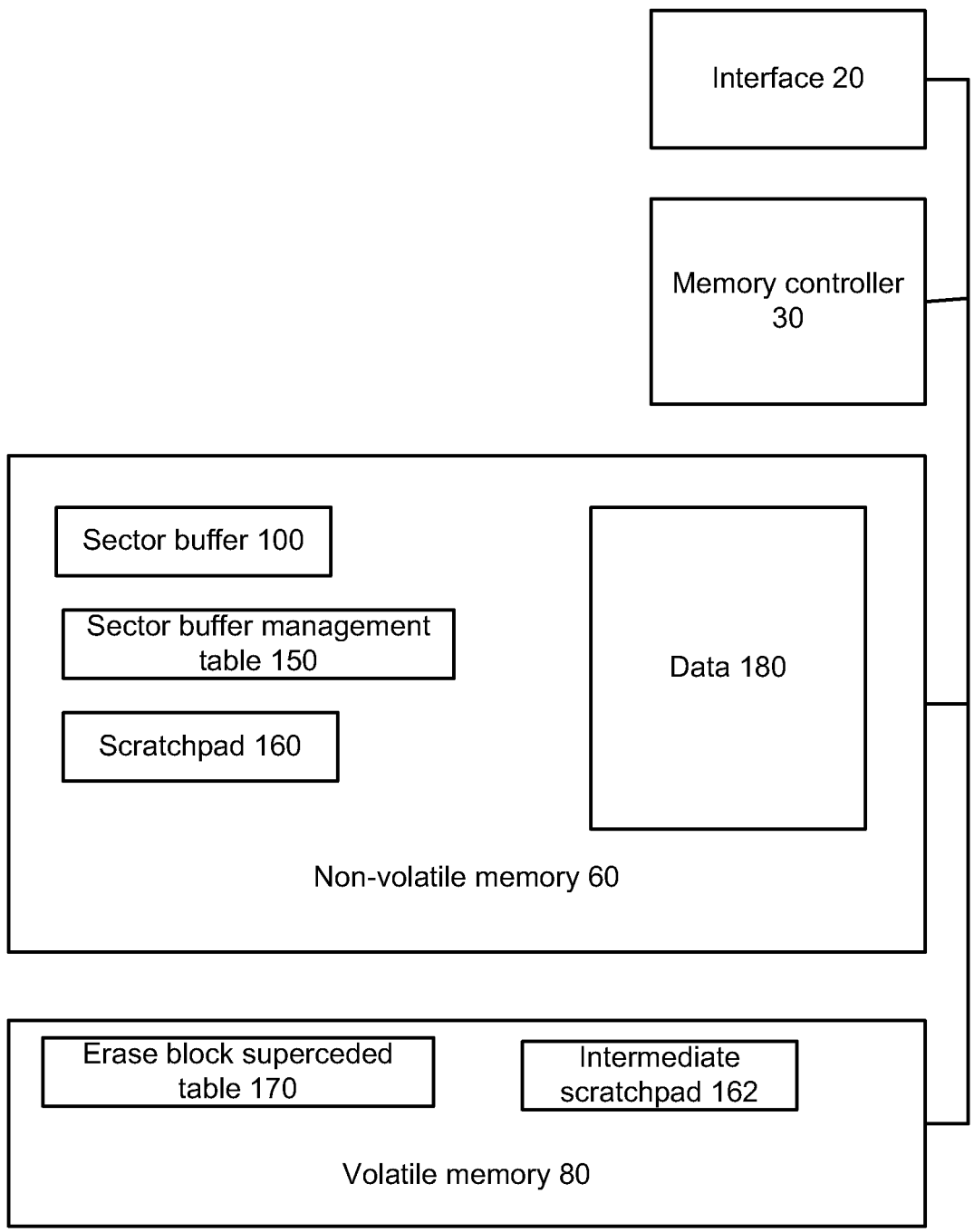
FIG. 1 schematically illustrates a system according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

A sector buffer is provided. It is stored in a non-volatile memory module. It stores recently written sectors (regardless of their addresses) and typically stores at each point in time several sectors that belong to (are associated with) the same erase block. This allows collecting several sectors that belong to the same erase block and rewrite the rest of the erase block, while virtually dividing the block rewrite time between the sectors. Thus, a sequence of sector addresses can be managed while complying with timing constraints such as the mentioned above 250 mS delay limitation. As the buffer contains sectors, the total amount of memory need not be large and is only a small fraction of the total memory.

FIG. 1 schematically illustrates system 10 according to an embodiment of the invention.

System 10 includes an interface 20, a memory controller 30, a non-volatile memory module 60 and a volatile memory module 80.

Non volatile memory module 60 stores a sector buffer 100, a sector buffer management table 150 and a scratchpad 160. Non volatile memory module 60 also stores data 180—including current and new erase blocks.

It is noted that the memory controller 30 can be integrated with the non-volatile memory module 60.

Volatile memory module 80 stores an erase block superseded table 170. All these data structure are managed by memory controller 30. Memory controller 30 can apply various algorithms for allocation of erase blocks to these data structures and for various other memory management tasks. A non-limiting example of a management of sector buffer management table 150 can be found at "Algorithms and Data Structures for Flash Memories" by Eran Gal and Sivan Toledo, ACM Computing Surveys (CSUR), Volume 37, Issue 2 (June 2005), pages 138-163, and is also published at http://www.tau.ac.il/~stoledo/Pubs/flash-survey.pdf.

Sector buffer 100 is a storehouse for newly written sectors until they are programmed into ("merged in" or "merged") to new erase blocks.

Sector buffer management table 150 is a relatively small table that includes pointers (referred to as sector pointers) to the sectors within sector buffer 100. Sector buffer management table 150 is used to manage a sector buffer.

Scratchpad 160 is used to store partial pages. As sectors are grouped into pages and then stored into sector buffer 100, scratchpad 160 collects all sectors until a sufficient amount of data is collected to complete a full page. Volatile memory module 80 can store an intermediate scratchpad 162 that receives new sectors as well as sectors from scratchpad 160 and stitches them together until a page is formed or until a stitching period ends. If a stitching period ends the content of the intermediate scratchpad 162 is sent to scratchpad 160.

Erase block superseded table 170 is a hash table that stores for each erase block the number of superseded sectors from that erase block that lie in the sector buffer.

Figure 2:
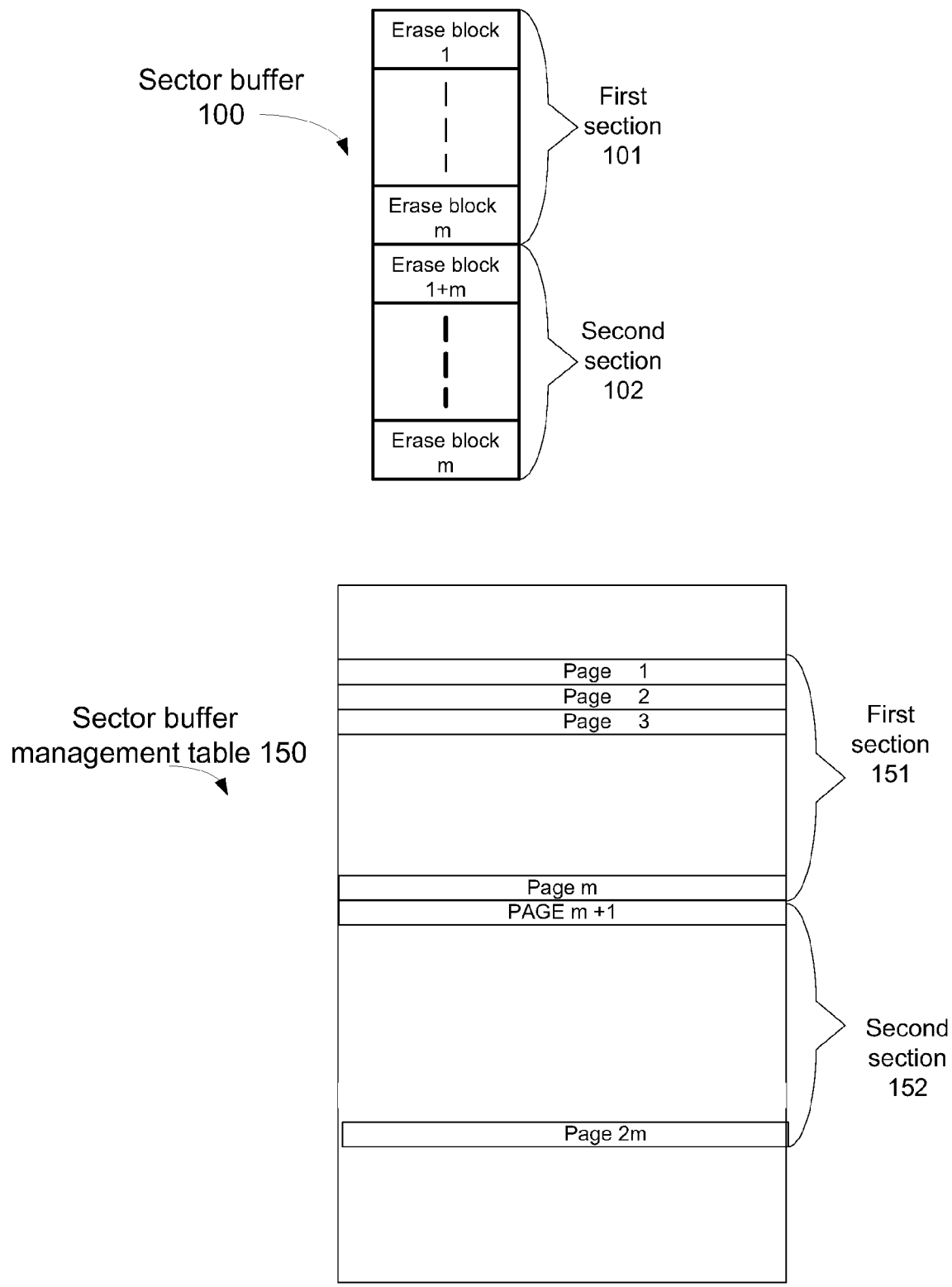
FIG. 2 illustrates a sector buffer and a sector buffer management table according to an embodiment of the invention.

FIG. 2 illustrates sector buffer 100 and sector buffer management table 150 according to an embodiment of the invention.

Sector buffer 100 (also referred to as sector buffer memory or random sector buffer) is divided into two sections of the same size—101 and 102. Each section of 101 and 102 includes at least m×B sectors where B is the number of sectors in an erase block in the system and m the number of erase blocks in a section and is a positive integer not smaller than a ratio between a merging operation period and between a maximal tolerable single sector write operation period. K is a design parameter selected such that an erase block rewrite time (merging operation period) divided by K is smaller than the maximal tolerable single sector write operation period (for example—250 mSec in the case of SD).

The ratio between the block rewrite time and K would approximately be the delay between consecutive sector writes.

Each of the two sections 101 and 102 may include an integer number of erase blocks.

For example, consider a 3 bits/cell device with a program time of 2 mS per page, 192 4 Kbytes-pages per block and 5500 managed erase blocks. The erase block rewrite time would be approximately 450 mS and therefore choosing K=4 would result around 115 mS delay between sector writes. Each erase block contains B=1536 sectors. Therefore, to cover the 5500*4 sectors per section, sector buffer 100 needs m=15 erase blocks for each section. Overall the sector buffer will include 30 erase blocks which form 0.55% of the total memory space of non-volatile memory module 60.

It is noted that by selecting m=15 it is ensured that the merge operation of the sectors in the first section (which includes at most 5500 block merges) could be completed before the second section of the sector buffer is filled and without inducing a delay larger than 115 mS.

The erase blocks allocated for these data structures may be not constant. New erase blocks can turn to old erase blocks (erase blocks that do not store updated sectors—due to merging operations on their sectors) and then be erased and be freed for other uses. At the same time, the indexing of the erase blocks can be modified to reflect which erase blocks are old and which are new at any point in time Sector buffer management table 150 can be a hash table. For each sector stored in sector buffer 100 several bits of sector buffer management table 150 are allocated. These bits identify the erase block (which is a logical erase block) to which this sector belongs and the number of the sectors within that erase block. Alternatively, each sector can be identified by the sectors logical address within the entire logical address space.

For example, in case there are 5500 erase blocks, each erase block includes 1536 sectors, there is no need to allocate more than 3 bytes to identify the sector. Therefore, if the sector buffer 100 includes at most 5500×4×2 sectors, there is a need of only 5500×8×3 bytes. This can be stored in as little as 33 pages (4 KB per page) on a single erase block.

Volatile memory module 80 can store a portion of these sector identifiers (for example—it can store one 4 KB page that includes (4096/3)=1356 sector identifiers.

Once enough sector identifiers are collected, they are stored in non volatile memory module 60. These sector identifiers can be stored in a next available page in the erase block allocated for storing sector buffer management table 150.

The update and storage of these data structures in the non volatile memory module 60 in a sequential manner—the information is stored in one page after the other until an entire erase block is filled and then information is stored at the next erase block. Therefore, if sector buffer management table 150 is encoded with a single layer algorithm (for example—SLC), No more than two erase blocks (each including 32 SLC pages, each containing 4 KB) should be needed for the sector buffer management table 150.

FIG. 2 illustrates that sector buffer management table 150 is divided into two sections 151 and 152. Each section includes T/2 pages and is allocated for managing sections 101 and 102 of sector buffer 100.

Thus, while merging sectors of first section 101 of sector buffer 100, the second section 102 of sector buffer 100 is being filled with new sectors and the appropriate management table pages (T/2+1 . . . T) of second section 152 are being updated. After merging all sectors in first section 101 of sector buffer 100, second section 152 of sector buffer management table 150 and its T/2 pages become not relevant and a notation switch occurs—the pages previously numbered T/2+1 . . . T will be numbered 1 . . . T/2.

Figure 3:
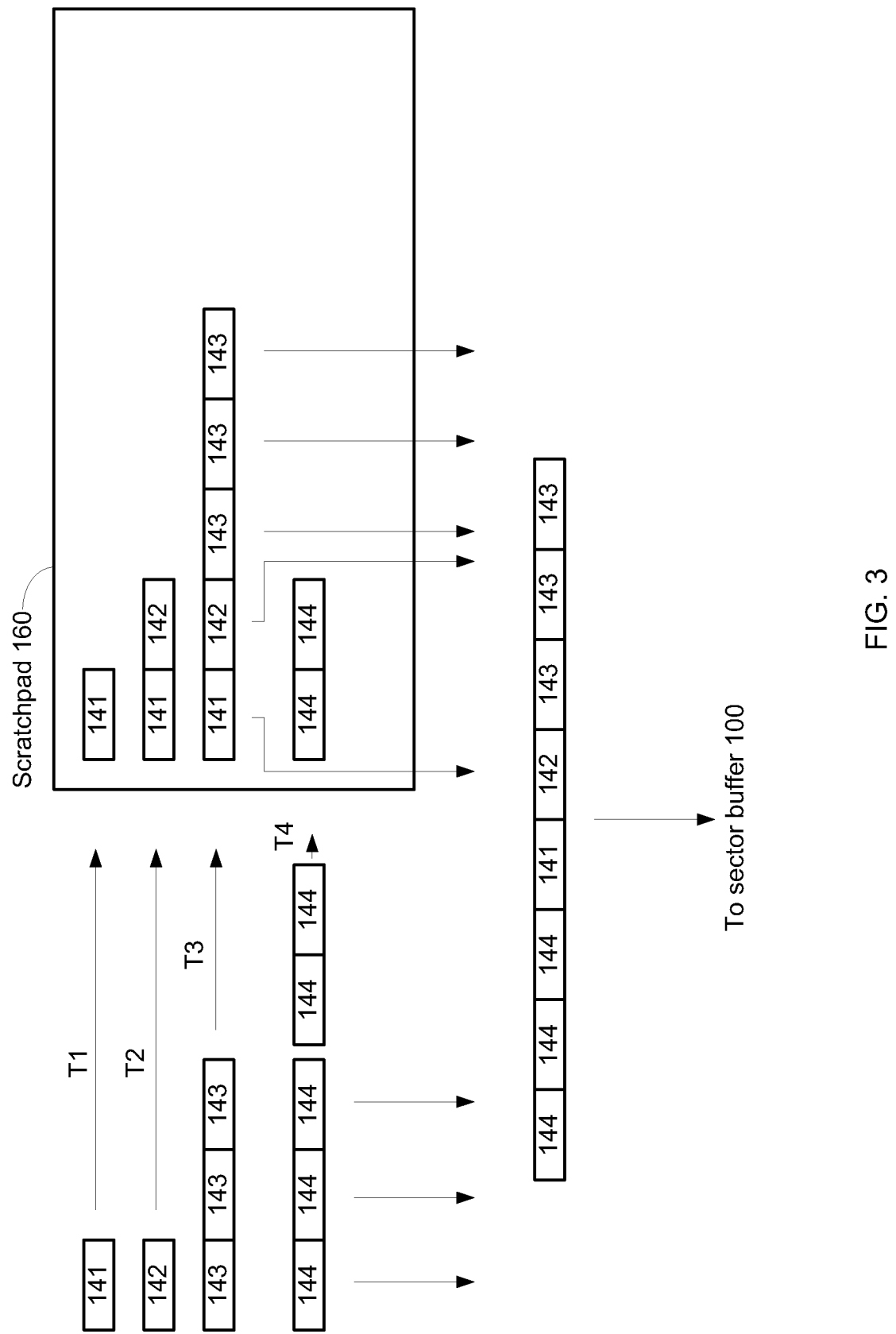
FIG. 3 illustrates a scratchpad and multiple scratchpad update operations according to an embodiment of the invention.

FIG. 3 illustrates scratchpad 160 and multiple scratchpad update operations according to an embodiment of the invention.

Scratchpad 160 stores partial page information before it is programmed into sector buffer 100. That is, scratchpad 160 buffers several sectors together until they occupy a complete page and can be programmed into sector buffer 100.

FIG. 3 illustrates scratchpad (also referred to as scratchpad area) 160 and four updates:

i. At a first point in time (t1) a first sector 141 is received by interface 20 and is stored into scratchpad 160.

ii. At a second point in time (t2) a second sector 142 is received by interface 20 and is stitched together with first sector 141 and programmed into a next page of the scratchpad.

iii. At a third point in time (t3) three additional sectors 143 are received by interface 20 and are stitched together with first and second sectors 141 and 142 and programmed into yet another page of scratchpad 160.

iv. At a fourth point in time (t4) five additional sectors 144 are received by interface 20. The first three sectors and the previous five sectors (received at t1, t2 and t3) form a page sent to sector buffer 100. The last two sectors that were received at t4 are written to scratchpad 160.

Erase block superseded table 170 stores a number of superseded pages per each erase block. The number can be stored in four bits (for example, such that indication of more than 14 superseded pages are always marked using the same 4 bit symbol) so that for 5500 erase blocks the erase block superseded table 170 can require about 2750 bytes.

Figure 4:
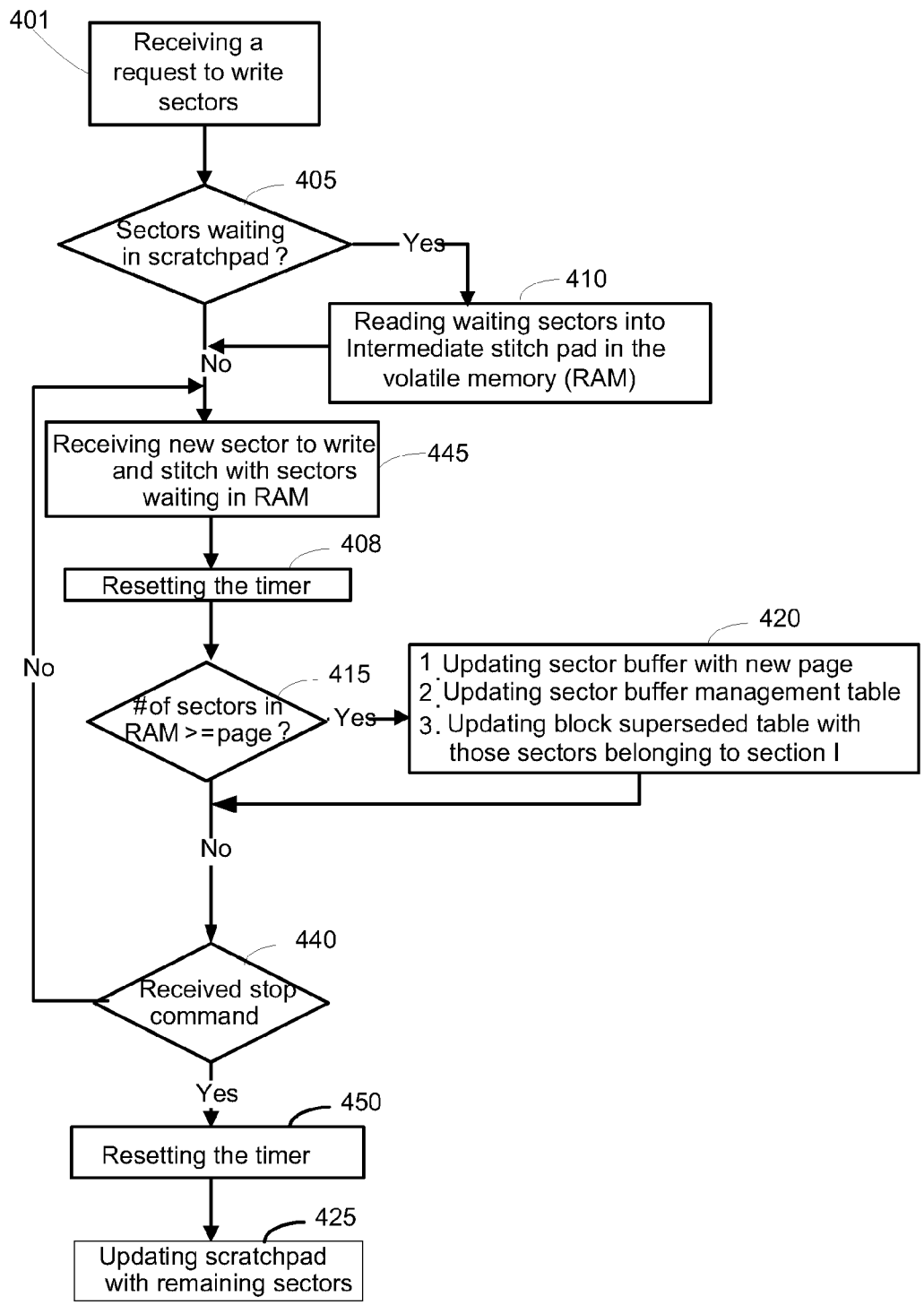
FIG. 4 illustrates a method for writing sectors to a non-volatile memory according to an embodiment of the invention.

FIG. 4 illustrates method 400 for writing sectors to a non-volatile memory according to an embodiment of the invention.

Method 400 collects together several sectors until they complete a full page and can be programmed to sector buffer 100. Until the page can be programmed, intermediate scratchpad 162 (or scratchpad 160) stores these sectors.

A timer can be initialized at the start of the writing operation and can be used to decide how many pages will be copied to a new erase block.

Method 400 starts by stage 401 of receiving a request to write sectors.

Stage 401 is followed by stage 405 of checking if scratchpad 160 stores sectors ("sectors waiting in scratchpad?"). If the answer is negative stage 405 is followed by stage 445.

Else, stage 405 is followed by stage 410 of reading waiting sectors into intermediate scratchpad 162. Stage 410 is followed by stage 445.

Stage 445 includes receiving the new sectors and stitching the received sectors with sectors in intermediate scratchpad 162.

Stage 445 is followed by stage 408 of resetting a timer.

Stage 408 is followed by stage 415 of checking if the intermediate scratchpad stores a full page "# of sectors in RAM>=page?".

If the intermediate scratchpad stores a full page then stage 415 is followed by stage 420 that includes: (i) updating sector buffer 100 with a new page (writing the page from intermediate scratchpad 162 to sector buffer 100); (ii) updating sector buffer management table 150 to indicate that the sectors included in that page are now stored at the sector buffer 100; and (iii) updating block superseded table 170 accordingly—increase the count for each erase block associated with a sector included in this page.

If the answer is negative, stage 415 is followed by stage 440 of checking if a stop command has been received. If such a command has not been received then stage 440 is followed by stage 445. If a stop command was received then stage 440 is followed by stage 450 of resetting the timer and stage 425 of updating scratchpad 160 with the remaining sectors.

Figure 5:
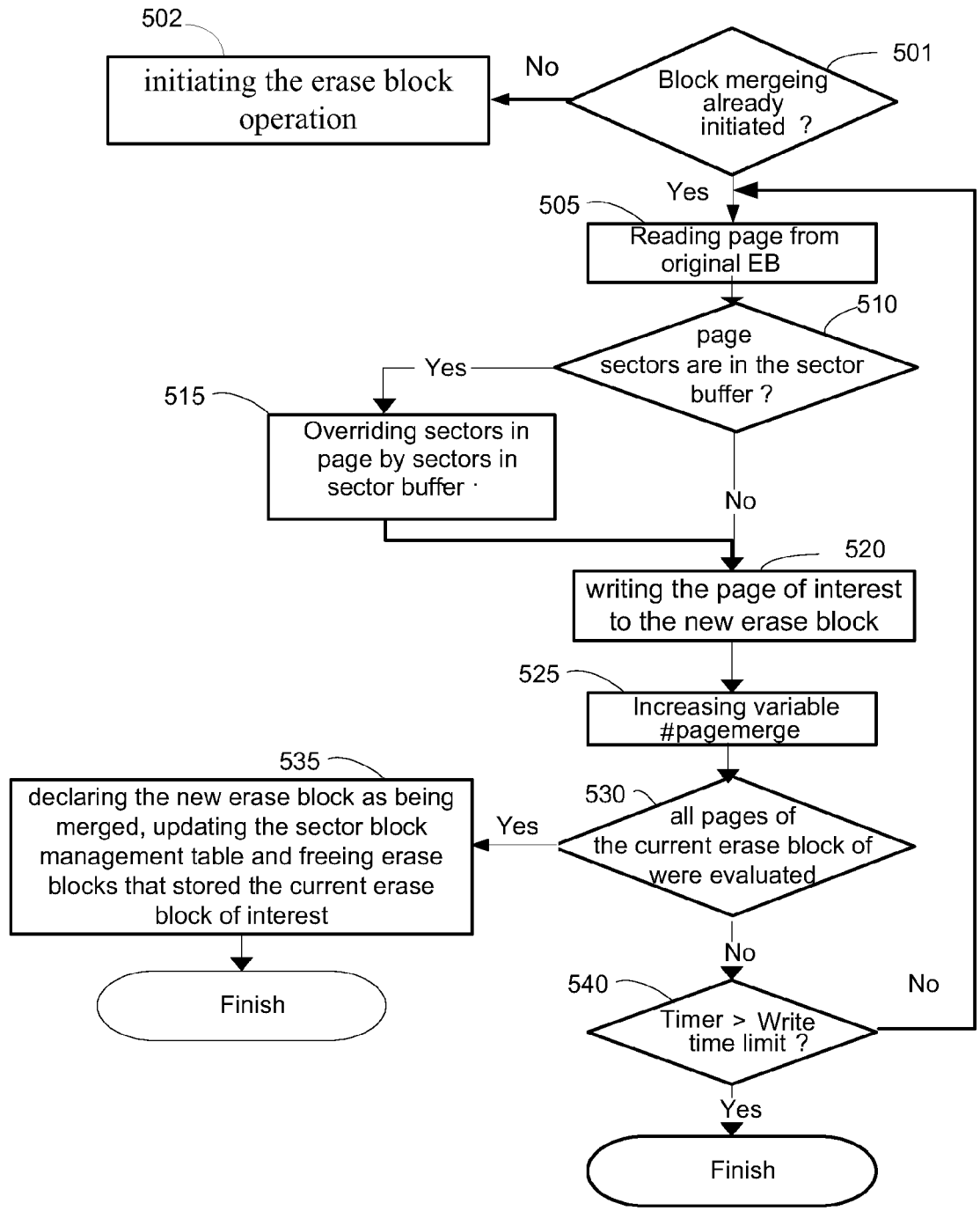
FIG. 5 illustrates a method for merging an erase block according to an embodiment of the invention.

FIG. 5 illustrates method 500 for merging an erase block according to an embodiment of the invention.

The erase block being merged is referred to the current erase block of interest.

Method 500 starts by stage 501 of checking if the erase block merging operation of the current erase block of interest was already initiated. If the answer is negative then stage 501 is followed by stage 502 of initiating the erase block operation.

If the erase block merging started then stage 501 is followed by stage 505 of reading a page of interest (identified by variable #pagemerge) of the current erase block of interest.

Stage 505 is followed by stage 510 of checking if the page of interest includes sectors in the sector buffer. This stage may include checking sector buffer management table 150. If the answer is negative stage 510 is followed by stage 520 of writing the page of interest to the new erase block.

Else—(the page of interest includes sectors in the sector buffer) stage 510 is followed by stage 515 of overriding sectors in the current page of interest by sectors stored in the sector buffer 100. Stage 515 is followed by stage 520.

Stage 520 is followed by stage 525 of increasing variable #pagemerge.

Stage 525 is followed by stage 530 of checking if all pages of the current erase block of interest were evaluated during stages 505-520. If all pages were evaluated then stage 530 is followed by stage 535 of declaring the new erase block as being merged, updating the sector block management table and freeing erase blocks that stored the current erase block of interest.

Referring back to stage 530—if not all blocks were evaluated then stage 530 is followed by stage 540 of checking if a period allocated for the merging has ended—by checking if a timer measured more than a write time limit. If the time limit was exceeded then method 500 ends else—stage 540 is followed by stage 505.

Figure 6:
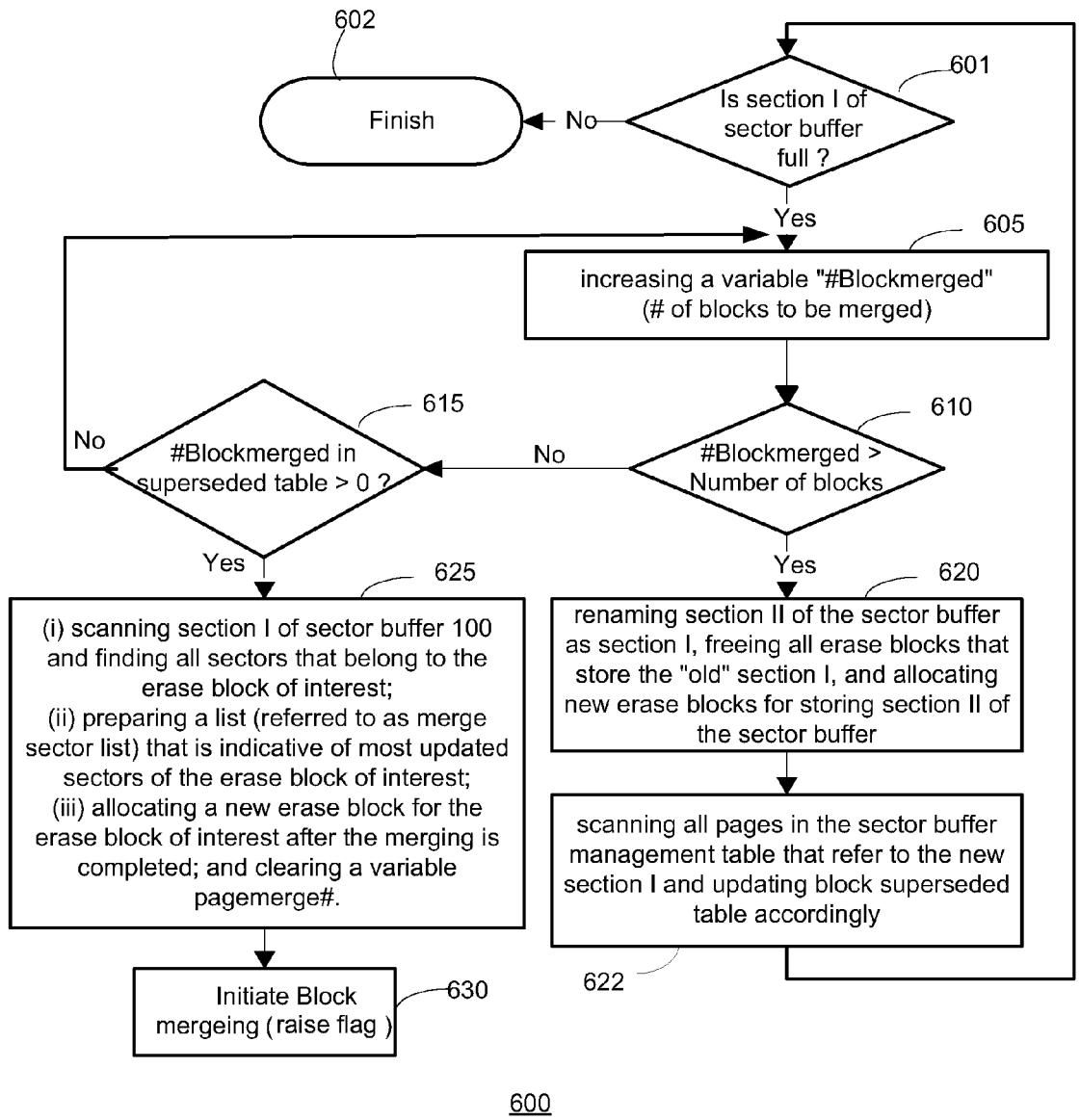
FIG. 6 illustrates a method for initiating an erase block merging according to an embodiment of the invention.

FIG. 6 illustrates method 600 for initiating erase block merging according to an embodiment of the invention.

Method 600 starts by stage 601 of checking a merge criterion—checking if the first section of sector buffer 100 is full.

If the answer is negative then method 600 ends—as illustrated by stage 602. Else—stage 601 is followed by stage 605 of increasing a variable "#Blockmerged" indicative of an erase block of interest that is going to be merged (from section I). This erase block can be referred to as the #Blockmerged erase block.

Stage 605 is followed by stage 610 of checking if the entire erase blocks were already merged—by comparing #Blockmerged to the overall number of blocks in section I (for example—comparing it to m).

If the all erase blocks of the first section were merged then there is a need to process the erase blocks of the second section of sector buffer. This is illustrated by stage 620 (that follows stage 610) of: renaming section II of the sector buffer 100 as section I, freeing all erase blocks that store the "old" section I, and allocating new erase blocks for storing section II of sector buffer 100.

Stage 620 is followed by stage 622 of scanning all pages in the sector buffer management table 150 that refer to the new section I and updating block superseded table 170 accordingly.

Referring back to stage 610—if only a part of the erase blocks of the first section were merged then stage 610 is followed by stage 615 of checking (by analyzing the block superseded table 170) if there are still any sectors of the erase block of interest ("element #Blockmerged in superseded table >0?"). If the answer is negative then there is a need to process a new erase block—and stage 615 is followed by stage 605.

If sector buffer 100 still stores one or more sectors that belong to the erase block of interest then stage 615 is followed by stage 625.

Stage 625 includes: (i) scanning section I of sector buffer 100 and finding all sectors that belong to the erase block of interest; (ii) preparing a list (referred to as merge sector list) indicative of most updated sectors of the erase block of interest; (iii) allocating a new erase block for the erase block of interest after the merging is completed; and clearing a variable pagemerge#.

Stage 625 is followed by stage 630 of initiating the merging of the erase block of interest ("initiate block merging (raise flag)").

Once a block merging is initiated, a sequence of page copying operations from the original erase block (current erase block of interest) to the new erase block is executed while overwriting old data with new data from the sector buffer. As demonstrated in FIG. 5. The copying is continued until a time limit is reached (for example—e.g. 250 mS). The block merging operation can then continue when the next write sector operation is performed.

An example of an amount of time required for such copying can be evaluated. For example, if an erase block includes 192 pages and it takes, on average, 2 ms to program a page and 200 uS to read the page from the previous block then in total it should take no more than 450 uS to perform the block merging.

Referring to method 600 of FIG. 6—the merging is initiated after section 1101 of sector buffer 100 is entirely full. Then the erase blocks that include superseded pages in section I are being merged. While section I is being merged, section II is filled with new sectors. However, since section II is large enough, then by the time it is filled, the merging of all blocks in section I can be completed.

It is noted that stage 625 execution period may not be negligible. Stage 625 can include scanning sector buffer management table 150 of an entire section. In the example stated above of a memory with 5500 blocks, sector buffer management table 150 will include 33 pages and for one section 17 pages. Therefore, step 625 requires reading 17 pages and comparing each element there. If stage 615 lasts 20 mS, then the overall block merging time will be 470 mS.

Assuming now that this block merging time is "divided" between 4 pages then an average delay of 117 mS per page is achieved. This is well within the 250 mS limit Read Operation Handling During a read operation there is a need to guarantee that if sector buffer 100 stores the most updated version of one or more sectors then these sectors are read. This can involve scanning sector buffer management table 150. This may take some time. In the examples above 33 pages were allocated for sector buffer management table 150.

Continuous Erase Block Merging

The block merging algorithm mentioned above begins when one of the sections (e.g. section I) of sector buffer 100 has been entirely filled. This means that by the time all erase blocks of section 1151 are merged, section II 152 will be in advanced stages of fill up.

According to another embodiment of the invention a continuous erase block merge method is provided. This method can start erase block merging very early, long before the first section 151 is full. This can result in more P/E cycling to the FLASH devices. On the other hand the size of sector buffer 100 can be reduced and this method can be suited for sequential erase block writing.

Figure 7:
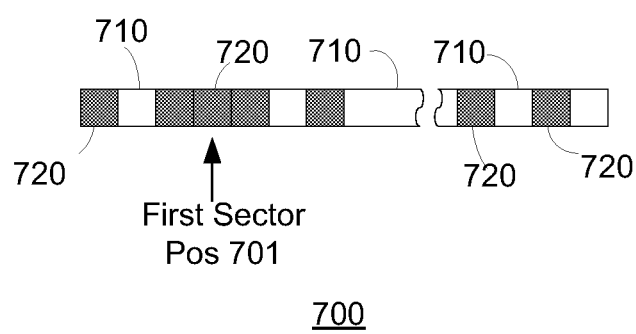
FIG. 7 illustrates a merged sector map and pointer to a first sector bit according to an embodiment of the invention.

In order to support the continuous erase block merging operations a new data structure is introduced—a merged sector map 700 of FIG. 7.

Merged sector map 700 is a bit map which has a bit for every sector in the sector buffer. Each bit identifies whether the respective sector has been merged or not. For example, assume we have 5500 blocks and k=4. The sector buffer will contain 5500*8 sectors. Therefore, merged sector map 700 will have 5500 bytes.

FIG. 7 illustrates merged sector map 700 and a pointer 701 to the first sector bit according to an embodiment of the invention.

Merged sector map 700 is a cyclic structure such that when the first of the erase blocks of sector buffer 100 has been completely merged, the sectors are renumbered such that the first sector in the next erase block of sector buffer 100 is now the first and the previously first erase block is now free for other uses. First sector position pointer 701 points to the beginning of merged sector map 700. Bits of merged sector map 700 that refer to merged erase blocks are denoted 710 while bits of merged sector map 700 that refer to unmerged erase blocks are denoted 720. It is noted that other values of these bits can be provided.

It is noted that other data structures (not cyclic, not bitmaps) can be used to provide this type of information.

Figure 8:
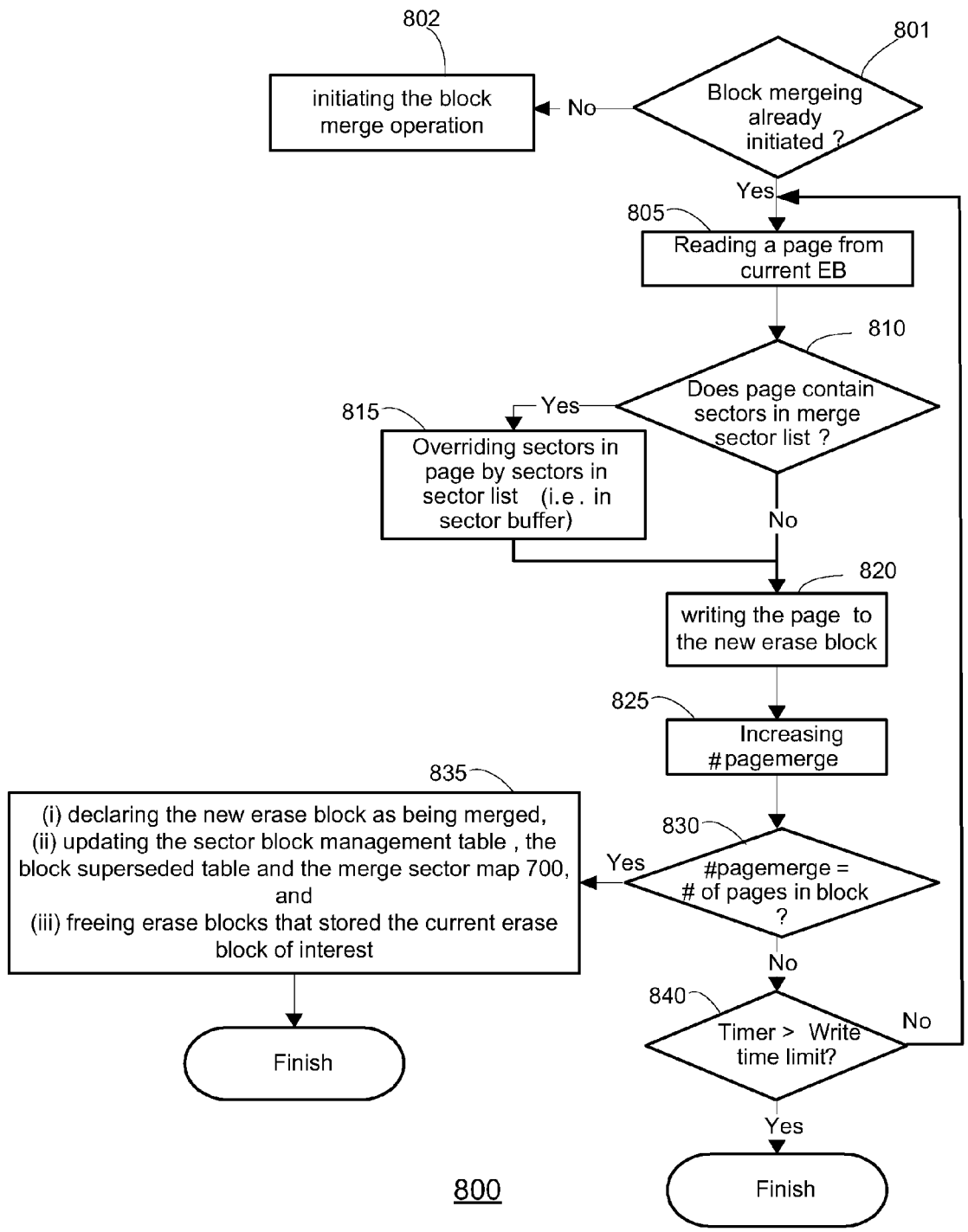
FIG. 8 illustrates a method for merging erase blocks according to an embodiment of the invention.

FIG. 8 illustrates method 800 for merging erase blocks according to an embodiment of the invention.

Method 800 starts by stage 801 of checking if the erase block merging operation of the current erase block of interest was already initiated. If the answer is negative then stage 801 is followed by stage 802 of initiating the erase block merge operation. This merging operation can start even if neither one of the sections of the sector buffer is full.

If the erase block merging started then stage 801 is followed by stage 805 of reading a page of interest (identified by variable #pagemerge) of the current erase block of interest.

Stage 805 is followed by stage 810 of checking if the page of interest includes sectors in the sector buffer. Stage 810 can include checking merge sector map 700.

If the answer is negative stage 810 is followed by stage 820 of writing the page of interest to the new erase block.

Else—(the page of interest includes sectors in the sector buffer) stage 810 is followed by stage 815 of overriding sectors in the current page of interest by sectors stored in the sector buffer 100. Stage 815 is followed by stage 820.

Stage 820 is followed by stage 825 of increasing variable #pagemerge.

Stage 825 is followed by stage 830 of checking if all pages of the current erase block of interest were evaluated during stages 805-820, i.e. variable #pagemerge equals to the number of pages in the block.

If all pages were evaluated then stage 830 is followed by stage 835. Stage 835 includes: (i) declaring the new erase block as being merged, (ii) updating sector block management table 150, block superseded table 170 and merge sector map 700, and (iii) freeing erase blocks that stored the current erase block of interest.

Referring back to stage 830—if not all blocks were evaluated then stage 830 is followed by stage 840 of checking if a period allocated for the merging has ended—by checking if a timer measured more than a write time limit. It the time limit was exceeded then method 800 ends else—stage 840 is followed by stage 805.

Stage 835 includes updating superseded block table 170 for all sector writes regardless of the actual section to which they belong.

Figure 9:
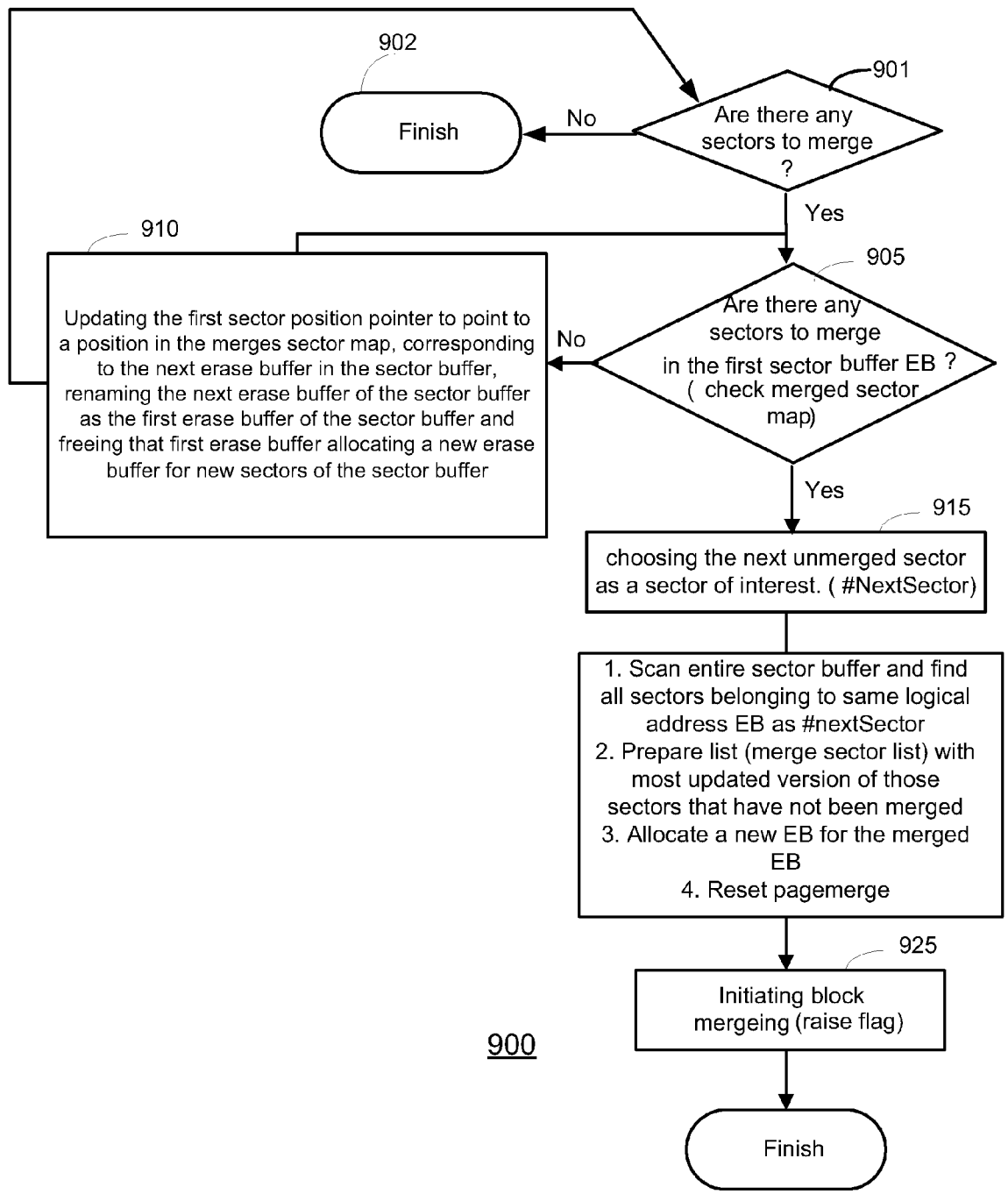
FIG. 9 illustrates a method for an erase block merging initiation according to an embodiment of the invention.

FIG. 9 illustrates method 900 for erase block merging initiation according to an embodiment of the invention.

Method 900 starts by stage 901 of checking a merge criterion—checking if there are any sectors to merge—there is no need to wait till a section of sector buffer 100 is full.

If the answer is negative then method 900 ends—as illustrated by stage 902. Else—stage 901 is followed by stages 905 and 910.

Stage 905 includes checking merged sector map 700 and determining if the first erase buffer of the merged sector map 700 is indicative of at least one sector to be merged in the erase buffer.

If the answer is negative stage 905 is followed by stage 910 of updating the first sector position pointer 701 to point to a position in the merges sector map 700, corresponding to the next erase buffer in the sector buffer 100, renaming the next erase buffer of the sector buffer 100 as the first erase buffer of the sector buffer 100 and freeing that first erase buffer allocating a new erase buffer for new sectors of the sector buffer 100. Stage 910 is followed by stage 901

If the answer is positive—the first erase block is indicative of one or more sectors to be merged then stage 905 is followed by stage 915 of choosing the next unmerged sector as a sector of interest. This sector of interest can be identified by a variable #NextSector.

According to another embodiment of the invention the sector of interest can be selected based on one or more different criteria. For example, stage 915 can include selecting a sector (from the first erase block in the sector buffer) which belongs to an erase block that has the largest number of unmerged sectors in the sector buffer. This will decrease the total number of block merging operations.

Stage 915 is followed by stage 920 of: (i) finding all sectors stored in the sector buffer 100 and belong to the same erase block (erase block of interest) as the sector of interest, and (ii) allocating a new erase block for the new erase block that is going to be generated by merging.

It is noted that a merge sector list is prepared as it may include only those sectors that belong to a certain targeted be for merge. Until stage 920 such information was not arranged in one list.

Stage 920 is followed by stage 925 of initiating an erase block of interest merge operation.

Method 900 does not wait for section 1101 to be filled before the block merging operation starts but can begin immediately. In case of sequential programming the immediate merge operations allows to shrink the number of unmerged sectors in the sector buffer to a bare minimum of just a handful number of sectors.

According to an embodiment of the invention the merge condition can change from time to time—allowing switching between methods of management such as methods 400, 500 and 600 on one hand and method 800 and 900 on the other or techniques that do not include sector buffers all together.

One management technique (such as standard techniques that do not include a sector buffer) may be well adapted for sequential or multi-sequential write operations and allow fast read and write operations. Such management techniques will typically not be able to handle a sequence of random sector writes and still meet the 250 mS limitation. Therefore, when a random sector write sequence is detected (e.g. buffers may be filled) a switch to the management method of 400, 500 and 600 or 800 and 900 can occur. When the buffers begin to empty and only sequential write sequences are left, a switch back (from method 800 and 900) to the fast management system may be carried out.

Increasing Speed of Read Operations

According to an embodiment of the invention sector buffer management table 150 is modified to allow a faster location of sectors that belong to a certain erase block and are stored in sector buffer 100.

The modification links between sector pointers that point to sectors of the same erase block. In addition, a list (last superseded sector pointer table) of the latest sector pointer per each erase block is provided. The search for sector pointers starts by looking at the list and then, using the linkage, locating one sector pointer after the other.

Figure 10:
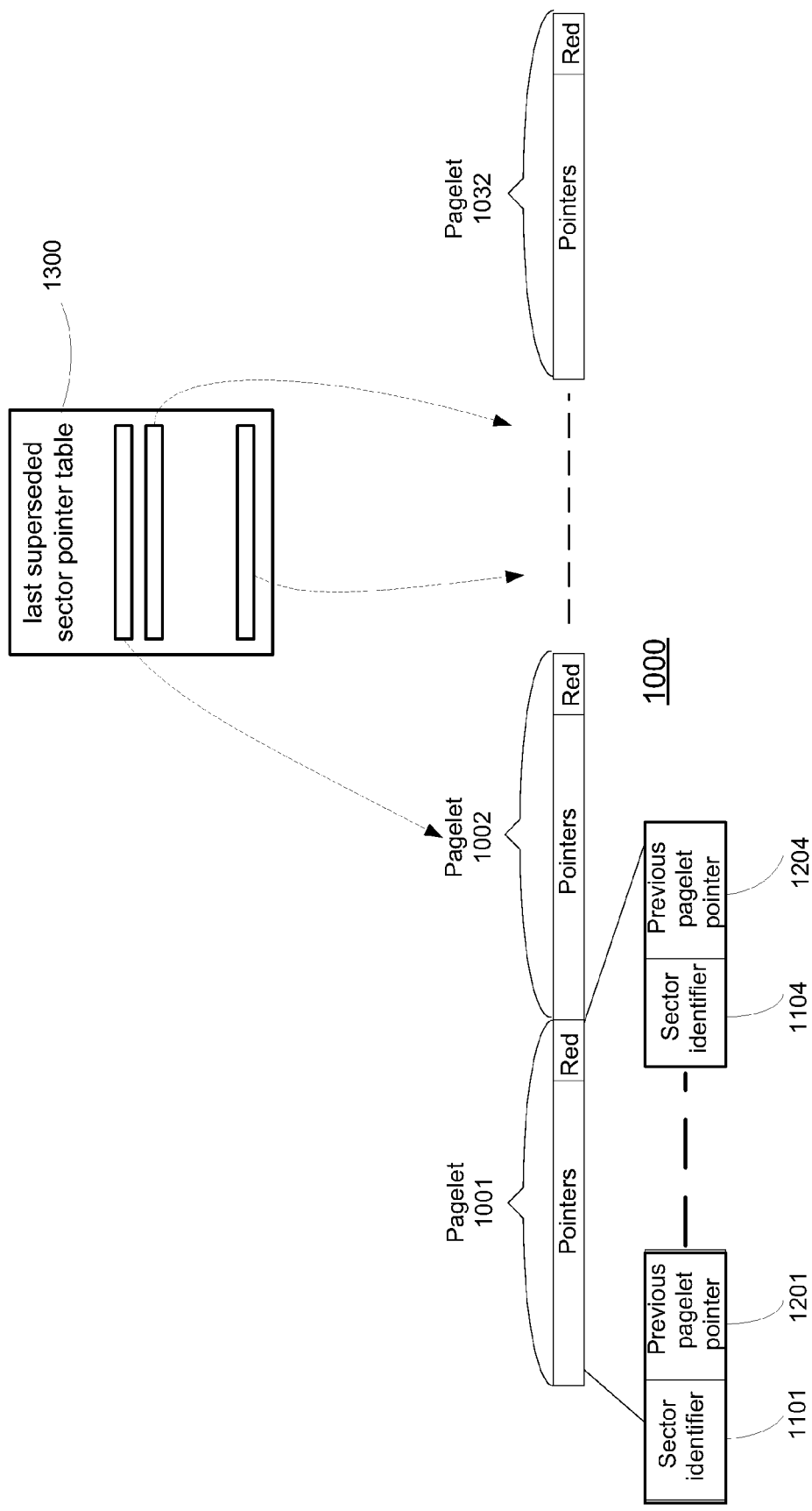
FIG. 10 illustrates a sector buffer management table and a last superseded sector pointer table according to an embodiment of the invention.

FIG. 10 illustrates a sector buffer management table 1000 and last superseded sector pointer table 1300 according to an embodiment of the invention.

Each page of sector buffer management table 1000 is divided into pagelets 1001-1132 (for example 4 pagelets per page with multiple redundancy bytes).

Each pagelet can be encoded separately and may be read and deciphered independently.

Each pagelet includes a list of sector pointers (denoted sector identifiers) and pointers to the previous pagelet that stores the sector pointers that point to sectors that belong to the same erase block. For example pagelet 1001 includes multiple sector pointers such as 1101 and 1104 and multiple previous pagelet pointers 1201 and 1204. Sector pointer 1101 points to a sector that belongs to a certain erase block. Previous pagelet pointer 1201 can point to another pagelet out of pagelets 1001-1032 that includes a sector pointer that points to another sector that belongs to the certain erase block.

As an example, if there are 5500 erase blocks and each erase block includes 192*8 sectors, there is a need of 24 bits for the sector pointer. If sector buffer management table 150 includes at most 33 pages and each pagelet includes 1024 data bytes, then 8 bits can be allocated for the previous pagelet pointer. In total, each element in sector buffer management table 1000 will use 4 bytes.

The last superseded sector pointer table 1300 can be stored in volatile memory module 80 and stores pointers to each pagelet that stores the last superseded sector of any erase block. This table is updated every time a new sector is written to sector buffer 100.

During read operation there is no need to scan the entire sector buffer management table 150. Instead—the last superseded sector pointer table 1300 is read and the linkage between pointers (previous pagelet pointers) is used to find all the sector pointers that point to sectors that belong to the erase block of interest being read.

The pointers above have been grouped according to the erase block they have pointed to. This grouping may be modified such that pointers will be grouped according to larger sets of data such as 2, 4, 8, 16 or more erase blocks.

Figure 11:
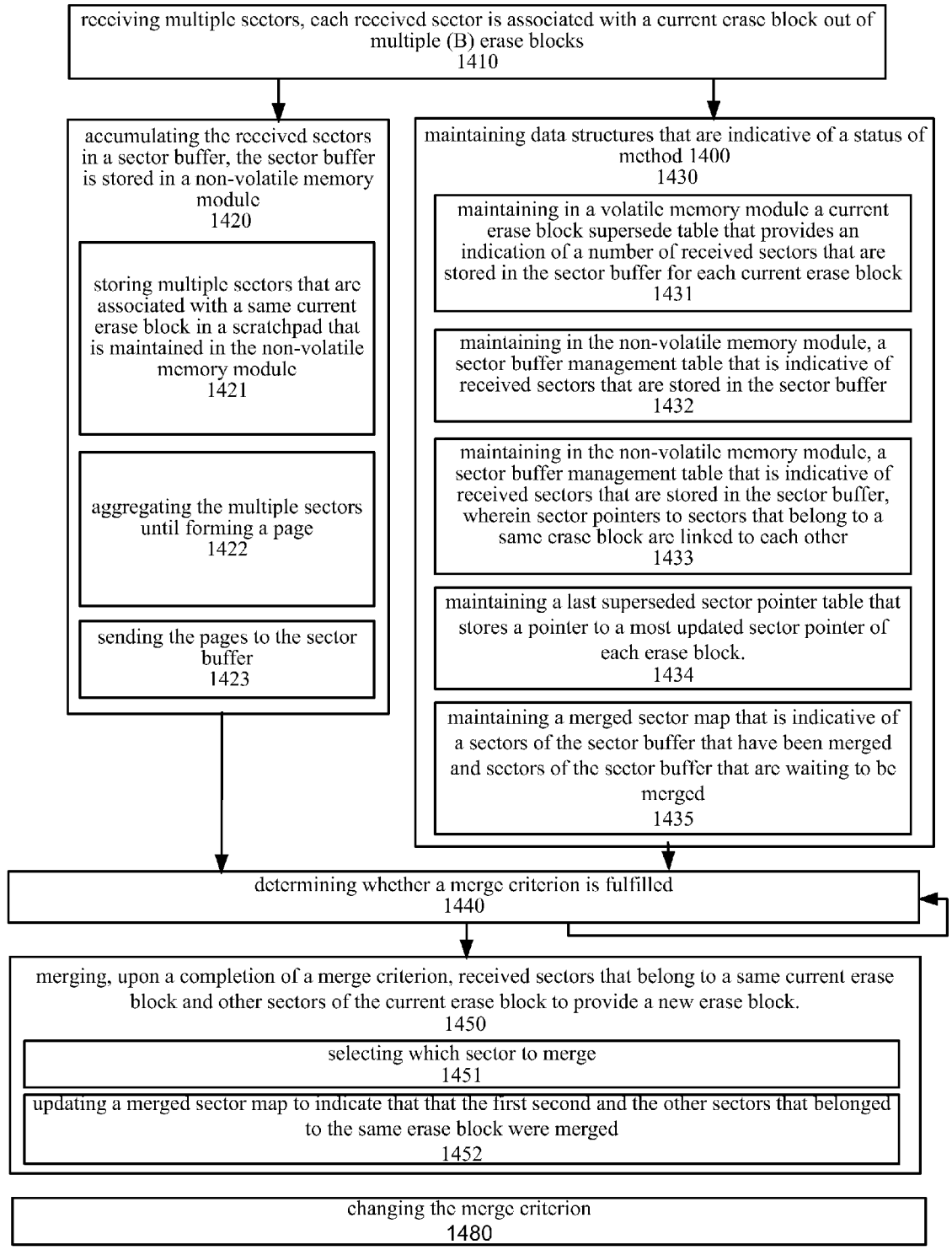
FIG. 11 illustrates a method for merging sectors of a flash memory module, according to an embodiment of the invention.

FIG. 11 illustrates method 1400 for merging sectors of a flash memory module, according to an embodiment of the invention.

Method 1400 starts by stage 1410 of receiving multiple sectors, each received sector is associated with a current erase block out of multiple (B) erase blocks. Stage 1410 can be repeated multiple times during the execution of other stages of method 1400.

Stage 1410 is followed by stages 1420 and 1430.

Stage 1420 includes accumulating the received sectors in a sector buffer, the sector buffer is stored in a non-volatile memory module. The sector buffer includes at least 2×m erase blocks where m=L×K/B where L is the number of erase blocks altogether, B is the number of sectors in an erase block and wherein K is a ratio higher than a merging operation period and between a maximal tolerable single sector write operation period.

Stage 1420 may include: (i) stage 1421 of storing multiple sectors associated with a same current erase block in a scratchpad maintained in the non-volatile memory module; (ii) stage 1422 of aggregating the multiple sectors until forming a page; and (iii) stage 1423 of sending the pages to the sector buffer.

Stage 1430 includes maintaining data structures indicative of a status of method 1400.

Stage 1430 can include stage 1431 of maintaining in a volatile memory module a current erase block supersede table that provides an indication of a number of received sectors stored in the sector buffer for each current erase block.

Stage 1430 can include stage 1432 of maintaining in the non-volatile memory module, a sector buffer management table indicative of received sectors stored in the sector buffer.

Stage 1430 may include stage 1433 of maintaining in the non-volatile memory module, a sector buffer management table indicative of received sectors stored in the sector buffer, wherein sector pointers to sectors that belong to a same erase block (or larger/smaller groups of data) are linked to each other.

Stage 1430 may include stage 1434 of maintaining a last superseded sector pointer table that stores a pointer to a most updated sector pointer of each erase block.

Stage 1430 may include stage 1435 of maintaining a merged sector map indicative of a sectors of the sector buffer that have been merged and sectors of the sector buffer waiting to be merged (the latter sectors are also referred to as non-merged sectors).

Stages 1420 and 1430 are followed by stage 1440 of determining whether a merge criterion is fulfilled. If the answer is negative stage 1440 is followed by itself. During this determination multiple iterations of stage 1410, 1420 and 1430 may occur.

Stage 1440 can include determining that the merge criterion is fulfilled if a predetermined portion of the sector buffer is full. Alternatively, stage 1440 can include determining that the merge criterion is fulfilled if there is a sector to be merged.

Conveniently, the sector buffer may include multiple sections, each section comprises at least m erase blocks and the method may include writing (during stage 1420) multiple sectors to a first section of the sector buffer while merging sectors (during stage 1450) stored in a second section of the sector buffer.

If the answer is positive (merge criterion is fulfilled) then stage 1440 is followed by stage 1450 of merging, upon a completion of a merge criterion, received sectors that belong to a same current erase block and other sectors of the current erase block to provide a new erase block.

Stage 1450 can include stage 1452 of updating a merged sector map (if such map is maintained) to indicate that that the first second and the other sectors that belonged to the same erase block were merged.

Stage 1450 can also include stage 1451 of selecting which sector to merge. This can be the next unmerged sector of a sector merge map, can be a sector that belongs to an erase block associated with a highest number of non-merged sectors (sectors that are waiting to be merged). Other selection criteria can be applied.

Method 1400 can also include stage 1480 of changing the merge criterion. This change affects stage 1450. Stage 1480 can include changing the merge criterion from (i) finding a first sector waiting to be merged (a first non-merged sector) according to the merged sector map, to (ii) determining that a predetermined portion of the sector buffer is full.

Figure 12:
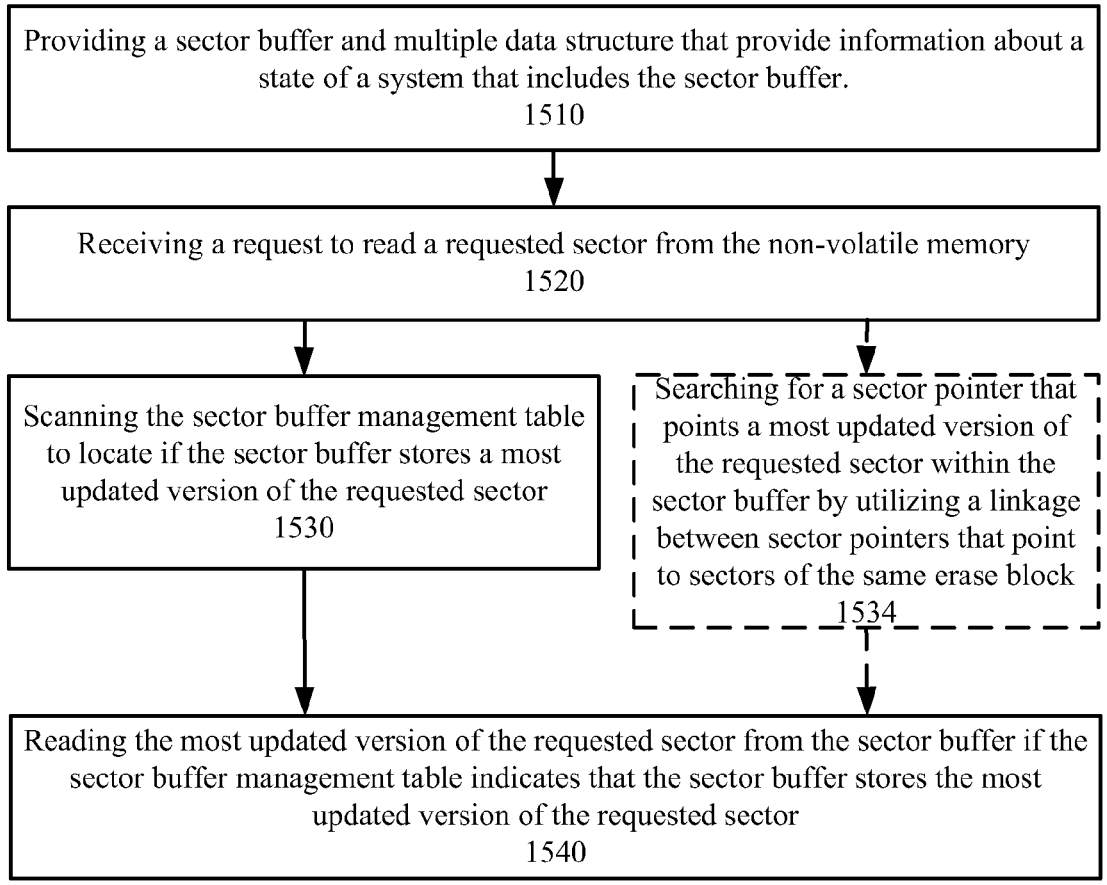
FIG. 12 illustrates a method for reading sectors of a flash memory module, according to an embodiment of the invention.

FIG. 12 illustrates method 1500 for reading sectors of a flash memory module, according to an embodiment of the invention.

Method 1500 starts by stage 1510 of providing a sector buffer and multiple data structure that provide information about a state of a system that includes the sector buffer. Stage 1510 may include providing data structures generated by applying method 1400.

Stage 1510 is followed by stage 1520 of receiving a request to read a requested sector from the non-volatile memory. The requested sec for can be associated with a requested erase block.

Stage 1520 is followed by stage 1530 of scanning the sector buffer management table to locate if the sector buffer stores a most updated version of the requested sector.

Stage 1530 is followed by stage 1540 of reading the most updated version of the requested sector from the sector buffer if the sector buffer management table indicates that the sector buffer stores the most updated version of the requested sector.

According to an embodiment of the invention stage 1520 is followed by stage 1534 of searching for a sector pointer that points a most updated version of the requested sector within the sector buffer by utilizing a linkage between sector pointers that point to sectors of the same erase block (or larger/smaller unit of data). Stage 1534 is followed by stage 1540.

Figure 13:
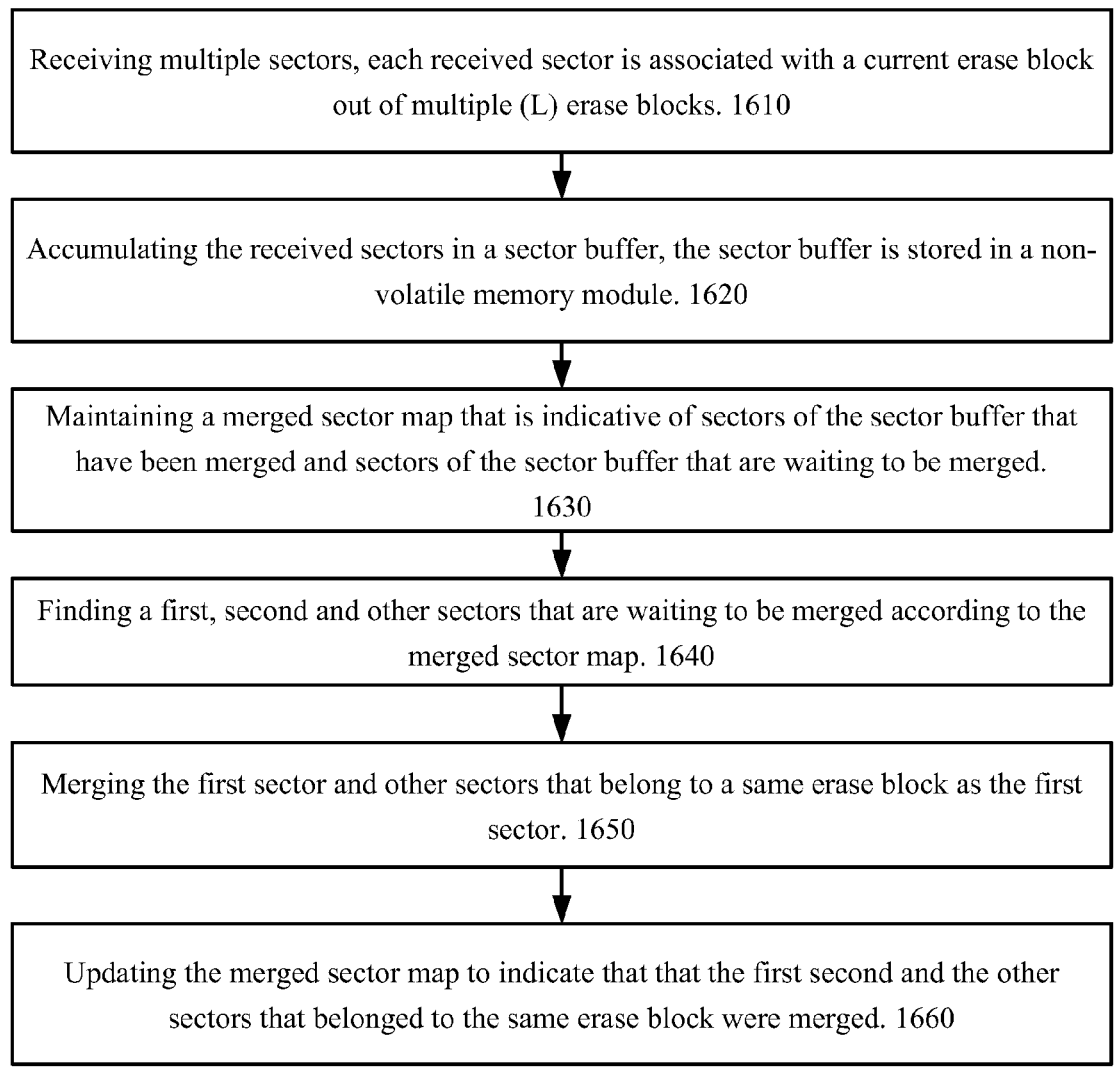
FIG. 13 illustrates a method for merging sectors of a flash memory module, according to an embodiment of the invention.

FIG. 13 illustrates method 1600 for merging sectors of a flash memory module, according to an embodiment of the invention.

Method 1600 starts by stage 1610 of receiving multiple sectors, each received sector is associated with a current erase block out of multiple (L) erase blocks Stage 1610 is followed by stage 1620 of accumulating the received sectors in a sector buffer, the sector buffer is stored in a non-volatile memory module.

Stage 1620 is followed by stage 1630 of maintaining a merged sector map indicative of sectors of the sector buffer that have been merged and sectors of the sector buffer waiting to be merged.

Stage 1630 is followed by stage 1640 of finding a first, second and other sectors waiting to be merged according to the merged sector map.

Stage 1640 is followed by stage 1650 of merging the first sector and other sectors that belong to a same erase block as the first sector.

Stage 1650 is followed by stage 1660 of updating the merged sector map to indicate that that the first second and the other sectors that belonged to the same erase block were merged.

Stage 1640 may include searching for a first sector that belongs to an erase block associated with a highest number of sectors waiting to be merged.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for merging sectors of a flash memory module comprising: receiving multiple sectors, each received sector associated with a current erase block out of multiple (B) erase blocks; accumulating the multiple sectors in a sector buffer, the sector buffer stored in a non-volatile memory module; and merging, upon a completion of at least one merge criterion, received sectors belonging to a same current erase block and at least one additional sector of the current erase block to provide a new erase block; wherein the sector buffer comprises at least 2.times.m erase blocks, wherein m=L.times.K/B, L is the total number of erase blocks, B is the number of sectors in the current erase block, and K is a ratio between a merging operation period and a maximal tolerable single sector write operation period.

2. The method according to claim 1, comprising merging the received sectors when a predetermined portion of the sector buffer is full.

3. The method according to claim 1, comprising maintaining in a volatile memory module a current erase block supersede table, the current erase block supersede table storing an indication of a number of received sectors stored in the sector buffer for each current erase block.

4. The method according to claim 1, comprising storing multiple sectors associated with a same current erase block in a scratchpad area maintained in the non-volatile memory module; aggregating the multiple sectors in the scratchpad area associated with the same current erase block until a page is formed; and sending the page to the sector buffer.

5. The method according to claim 1, wherein the sector buffer comprises multiple sections, wherein each section comprises at least m erase blocks, wherein the method comprises: writing multiple sectors to a first section of the sector buffer; and merging sectors stored in a second section of the sector buffer.

6. The method according to claim 1, comprising maintaining in the non-volatile memory module, a sector buffer management table indicative of received sectors stored in the sector buffer.

7. The method according to claim 5, comprising: receiving a request to read a requested sector from the non-volatile memory; scanning the sector buffer management table to determine whether the sector buffer stores a most updated version of the requested sector; and reading the most updated version of the requested sector from the sector buffer if the sector buffer management table indicates that the sector buffer stores the most updated version of the requested sector.

8. The method according to claim 1, comprising maintaining in the non-volatile memory module, a sector buffer management table indicative of received sectors stored in the sector buffer, wherein sector pointers that point to sectors belonging to a same erase block are linked to each other.

9. The method according to claim 8, comprising maintaining a last superseded sector pointer table, said last superseded sector pointer table storing a plurality of pointers to most updated sector pointers of each respective erase blocks.

10. The method according to claim 9, comprising: receiving a request to read a requested sector from the flash memory module, the requested sector being associated with a requested erase block; searching for a sector pointer that points to a most updated version of the requested sector stored within the sector buffer by utilizing a linkage between sector pointers that point to sectors of the same erase block; reading a most updated version of the requested sector from the sector buffer if the sector buffer management table indicates that the sector buffer stores the most updated version of the requested sector.

11. The method according to claim 1, comprising: maintaining a merged sector map indicative of sectors of the sector buffer that have been merged and non-merged sectors of the sector buffer determining that the at least one merge criterion is fulfilled based on finding a first non-merged sector according to the merged sector map; merging the first non-merged sector and an additional sector belonging to a same erase block as the first non-merged sector; the additional sector being written to the current erase block before the receiving of the multiple sectors; and updating the merged sector map to indicate that that the first and the other sectors belonging to the same erase block have been merged.

12. The method according to claim 11, comprising searching for a first sector belonging to an erase block, the erase block associated with a highest number of non-merged sectors.

13. The method according to claim 11, comprising changing the merge criterion from (i) finding a first non-merged sector according to the merged sector map to (ii) determining that a predetermined portion of the sector buffer is full.

14. A system for merging sectors of a flash memory module, the system comprises: an interface, for receiving multiple sectors, each received sector is associated with a current erase block out of multiple (L) erase blocks; a non-volatile memory module, for storing a sector buffer; and a memory controller, for controlling an accumulation of the multiple sectors in the sector buffer, and for controlling a merging, upon a completion of at least one merge criterion, of received sectors that belong to a same current erase block and of at least one additional sector of the current erase block to provide a new erase block; wherein the sector buffer comprises at least 2.times.m erase blocks, wherein m=L.times.K/B, L is the total number of erase blocks, B is the number of sectors in the current erase block, and K is a ratio between a merging operation period and a maximal tolerable single sector write operation period.

15. The system according to claim 14, wherein the memory controller is configured to facilitate the merging when a predetermined portion of the sector buffer is full.

16. The system according to claim 14, further comprising a volatile memory module; wherein the memory controller is configured to maintain in the volatile memory module a current erase block supersede table, the a current erase block supersede table provides an indication of a number of received sectors stored in the sector buffer for each current erase block.

17. The system according to claim 14, wherein the non-volatile memory module is configured to store a scratchpad area; and wherein the memory controller is configured to: control a storing of multiple sectors associated with a same current erase block in the scratchpad area; control an aggregation of the multiple sectors associated with the same current erase block until forming a page; and control a sending of the page to the sector buffer.

18. The system according to claim 14, wherein the sector buffer comprises multiple sections, each section comprises at least m erase blocks; and wherein the memory controller is configured to control a writing of multiple sectors to a first section of the sector buffer and to control a merge of sectors stored in a second section of the sector buffer.

19. The system according to claim 14, wherein the non-volatile memory module is configured to store a sector buffer management table indicative of received sectors stored in the sector buffer.

20. The system according to claim 19, wherein the interface is configured to receive a request to read a requested sector from the non-volatile memory; wherein the memory controller is configured to scan the sector buffer management table to determine if the sector buffer stores a most updated version of the requested sector; and wherein the memory controller is configured to read the most updated version of the requested sector from the sector buffer if the sector buffer management table indicates that the sector buffer stores the most updated version of the requested sector.

21. The system according to claim 14, wherein the non-volatile memory module is configured to store a sector buffer management table indicative of received sectors stored in the sector buffer, wherein sector pointers to sectors that belong to a same erase block are linked to each other.

22. The system according to claim 21, wherein the memory controller is configured to maintain a last superseded sector pointer table, the last superseded sector pointer table stores a pointer to a most updated sector pointer of each erase block.

23. The system according to claim 22, wherein the interface is configured to receive a request to read a requested sector from the non-volatile memory, the requested sector is associated with a requested erase block; and wherein the memory controller is configured to: search for a sector pointer that points a most updated version of the requested sector within the sector buffer by utilizing a linkage between sector pointers that point to sectors of the same erase block; and read a most updated version of the requested sector from the sector buffer if the sector buffer management table indicates that the sector buffer stores the most updated version of the requested sector.

24. The system according to claim 23, wherein the non-volatile memory is for storing a merged sector map indicative of a sectors of the sector buffer that have been merged and of non-merged sectors; wherein memory controller is configured to: determine that the merge criterion is fulfilled when finding a first non-merged sector and an additional sector according to the merged sector map;

merge the first non-merged sector and an additional sector that belongs to a same erase block as the first non-merged sector; and update the merged sector map to indicate that that the first non-merged sector and the other sectors that belonged to the same erase block were merged.

25. The system according to claim 23, wherein the memory controller is configured to search for a first sector that belongs to an erase block associated with a highest number of non-merged sectors.

26. The system according to claim 23, wherein the memory controller is configured to change the merge criterion from (i)

finding a first non-merged sector, to (ii) determining that a predetermined portion of the sector buffer is full.

* * * * *